United States Patent
Semba

(10) Patent No.: US 9,479,496 B2
(45) Date of Patent: Oct. 25, 2016

(54) COMMUNICATION TERMINAL AND SECURE LOG-IN METHOD ACQUIRING PASSWORD FROM SERVER USING USER ID AND SENSOR DATA

(71) Applicant: FUJITSU LIMITED, Kawasaki-shi, Kanagawa (JP)

(72) Inventor: Satoshi Semba, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/640,090

(22) Filed: Mar. 6, 2015

(65) Prior Publication Data
US 2015/0256530 A1  Sep. 10, 2015

(30) Foreign Application Priority Data
Mar. 10, 2014 (JP) .................. 2014-046933

(51) Int. Cl.
*H04L 9/32* (2006.01)
*H04L 29/06* (2006.01)
*H04W 12/06* (2009.01)
*G06F 9/40* (2006.01)

(52) U.S. Cl.
CPC ......... *H04L 63/083* (2013.01); *H04L 63/0815* (2013.01); *H04L 63/0853* (2013.01); *H04L 63/0861* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 8,713,705 B2* | 4/2014 | Ronchi ................ | G06F 21/126 726/29 |
| 2003/0105966 A1* | 6/2003 | Pu ........................ | G06F 21/31 713/186 |
| 2006/0218629 A1 | 9/2006 | Pearson et al. | |
| 2007/0240204 A1* | 10/2007 | Somekawa ........... | H04L 63/08 726/5 |
| 2013/0227663 A1* | 8/2013 | Cadenas Gonzalez ........... | H04L 63/0815 726/6 |
| 2014/0041009 A1 | 2/2014 | Kousaka | |
| 2014/0059671 A1* | 2/2014 | Celi, Jr. .............. | G06F 21/6236 726/18 |
| 2014/0351951 A1* | 11/2014 | Ronchi ................ | G06F 21/126 726/27 |

FOREIGN PATENT DOCUMENTS

| | | |
|---|---|---|
| EP | 2453400 A1 | 5/2012 |
| JP | 2004-151977 | 5/2004 |
| JP | 2011-221729 | 11/2011 |
| JP | 2013-057988 | 3/2013 |
| WO | 2006/021865 A1 | 3/2006 |
| WO | 2012/045376 A1 | 4/2012 |

OTHER PUBLICATIONS

An Improved Biometrics-Based Remote User Authentication Scheme with User Anonymity. Khan et al. Hindawi(2013).*
User Authentication Mechanism Using Authentcation Server in Home Network. Lee et al. ICACT(2006).*
Extended European Search Report dated Aug. 11, 2015 for corresponding European Patent Application No. 15158188.1, 7 pages.

* cited by examiner

*Primary Examiner* — Venkat Perungavoor
(74) *Attorney, Agent, or Firm* — Fujitsu Patent Center

(57) ABSTRACT

A communication terminal is provided with functions to redirect authentication data, make a substitute reply of a password to a biometric authentication part, and transfer the authentication data transmitted after the password to a browser's child process, in order to perform a substitute authentication using the biometric authentication or token, without requiring a user to input the password.

20 Claims, 11 Drawing Sheets

COMMUNICATION TERMINAL AND SECURE LOG-IN METHOD ACQUIRING PASSWORD FROM SERVER USING USER ID AND SENSOR DATA

CROSS-REFERENCE TO RELATED APPLICATIONS

This application is based upon and claims the benefit of priority of the prior Japanese Patent Application No. 2014-046933, filed on Mar. 10, 2014, the entire contents of which are incorporated herein by reference.

FIELD

The embodiments discussed herein are related to a communication terminal, a secure log-in method, and a computer-readable storage medium.

BACKGROUND

Recently, a remote log-in is made from a mobile terminal, such as a smartphone, a table, or the like, to a service server that is connected to a network such as the Internet or the like. For example, a password is used for a use authentication at the time of the remote log-in. However, when the password is stolen by an unauthorized third party, the unauthorized third party can make the remove log-in using the stolen password. Although security may be improved by making the password long, a keyboard displayed on a screen of a mobile terminal is small, and operability of this keyboard is poor compared to that of a desktop PC (Personal Computer) or the like. Consequently, the longer the password, the more load on the user of the mobile terminal.

On the other hand, the user authentication may be performed using biometric authentication or a user's belonging. The biometric authentication may use fingerprint, vein, iris, or the like, for example. On the other hand, the user's belonging may include an IC (Integrated Circuit) card, a USB (Universal Serial Bus) token, or the like, for example. It is relatively ease for the desktop PC or the like may perform the user authentication using the biometric authentication or the user's belonging by externally connecting thereto a device, such as a biometric sensor, an information reader, or the like. However, in the mobile terminal, certain functions may be restricted due to security restrictions, business model restrictions, or the like. The certain functions may include, for example, a function to add a device driver to the mobile terminal, a function to make a substitute input of a password used for a communication between applications by an inter-process communication, a function to make a substitute reply of the password to an authentication server by a browser plug-in, or the like. In the mobile terminal having such restricted functions, it is difficult to externally connect thereto the device that is used for the user authentication in order to perform the user authentication using the biometric authentication or the user's belonging.

According to the conventional mobile terminal, it is difficult to add an authenticating function by externally connecting thereto a device that is used for the user authentication.

Related art known to applicant includes Japanese Laid-Open Patent Publication No. 2011-221729, Japanese Laid-Open Patent Publication No. 2004-151977, and Japanese Laid-Open Patent Publication No. 2013-57988, for example.

SUMMARY

Accordingly, it is an object in one aspect of the embodiment to provide a communication terminal, a secure log-in method, and a computer-readable storage medium, which can add an authenticating function by externally connecting to the communication terminal a device that is used for the user authentication.

According to one aspect of the embodiment, a communication terminal communicable with first and second servers through a network, includes a processor including a browser, a host controller, an operating system, and an authentication-management-application, wherein the browser starts a child process using, as an argument, an inter-process communication received from another application, wherein the operating system controls the host controller by calling one of a plurality of interfaces, including a certain interface that controls a sensor, and wherein the authentication-management-application exchanges data with the sensor that is coupled to the host controller through the certain interface of the operating system, and performs a process including requesting a user authentication by transmitting to the second server a user ID and matching data detected by the sensor, and acquiring a password transmitted from the second server in a case in which the user authentication is successful; replaying, between the first server and the second server, authentication data transmitted from the first server in response to requesting the first server to provide a service; transmitting a user ID that is prepared in advance and the acquired password to the second server, in a case in which a screen that urges the user ID and the password to be input is received from the second server; and disconnecting a communication with the second server without redirecting an authentication response that includes information specifying the first server and is transmitted from the second server in a case in which a pair of the user ID and the password transmitted to the second server is stored in the second server and authentication is successful, and starting the child process of the browser by the argument based on the authentication response and transmitting the authentication response to the first server, in order to make a log-in to and receive the service from the first server.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram for explaining an example of the load reducing method implementing a plug-in;

DESCRIPTION OF EMBODIMENTS

Preferred embodiments of the present invention will be described with reference to the accompanying drawings.

A description will now be given of the communication apparatus, the secure log-in method, and the computer-readable storage medium in each embodiment according to the present invention.

A service, such as a word processing function, a scheduling function, a mail function, a game function, or the like, may be provided to a user by executing a program in a client, such as a PC or the like. However, a cloud service has recently become popular. The cloud service executes a large part of the program in a server that is connected to the client through a network, and the client only executes a browser to make a display on the browser. Presently, various pay and free cloud services are provided.

According to the cloud service, it is unnecessary to perform kitting of the client, and a program update need only be performed at the server. In addition, because the client only needs to make the display, the cloud service may be received by a client having a relatively low performance. For this reason, the cloud service is suited for use in the client having the relatively low performance, such as a mobile terminal including a smartphone, a tablet, or the like. Utilization of the cloud service from the mobile terminal is thus increasing.

Figure 1:
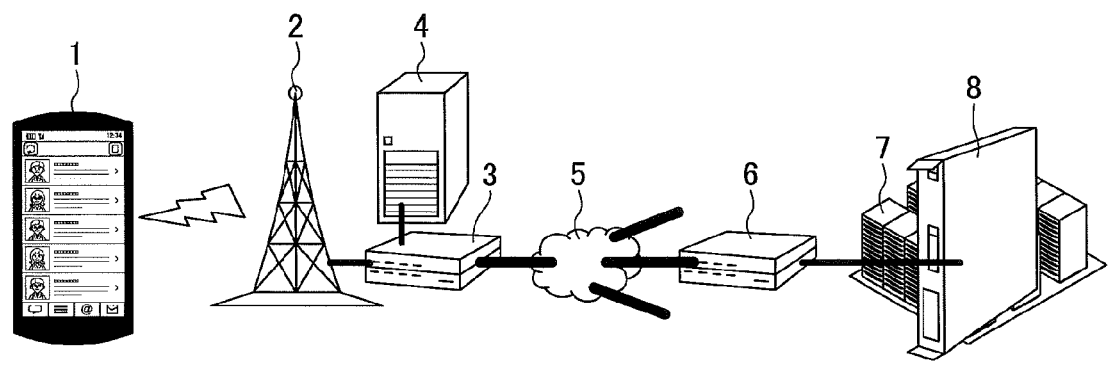
FIG. 1 is a diagram illustrating an example of a configuration for making a connection from a mobile terminal to a cloud service.

FIG. 1 is a diagram illustrating an example of a configuration for making a connection from the mobile terminal to the cloud service. In FIG. 1, a mobile terminal 1 is an example of a communication terminal or a client communicable by a 3G (3rd Generation) wireless access system, such as W-CDMA (Wideband Code Division Multiple Access) or the like. This mobile terminal 1 includes a browser, a mailer, and various kinds of application software (hereinafter also referred to as "applications"). Amongst the browser, the mailer, and the various kinds of applications, a program that operates by linking with an external service stores a URL (Uniform Resource Locator) of a connecting destination.

The mobile terminal 1 exchanges digital data with an antenna 2 for wireless communication owned by a communication common carrier. A router 33 of a base station connected to the antenna 2 judges whether a destination of a packet sent from the mobile terminal 1 is a server 4 within the base station or the Internet 5, and relays the packet to the destination. The server 4 of the base station may be formed by a DHCP (Dynamic Host Configuration Protocol) server or the like that transmits an IP (Internet Protocol) address and various settings to the mobile terminal 1, for example. The server 4 of the base station provides the mobile terminal 1 with information that enables the mobile terminal 1 to communicate through the Internet 5. Hence, the mobile terminal 1 can connect to the Internet 5 through the router 3.

A plurality of routers are connected to the Internet 5, and the plurality of routers can exchange packets through the Internet 5. A router of a cloud service provider, or a relay router for connecting to the router of the cloud service provided, is also connected to the Internet 5 at a certain location. A router 6 provides a relay between the Internet 5 and a network that is formed by a server group 7 owned by the cloud service provider. In the service server group 7 owned by the cloud service provider, a service server 8 performs a computation (or operation) in response to a request from the mobile terminal 1, and returns a response to the mobile terminal 1.

As described above, a connection made from the mobile terminal 1 to the service server 8 is different from a connection made from a PC to a service server, in that the connection from the mobile terminal 1 to the service server 8 is always made through the base station and the Internet 5. Particularly in a company having a medium size or greater, the PC is often connected to an intranet of the company, and the service server within the company is often used without making a connection through the Internet. A similar connection is made by the mobile terminal when using Wi-Fi (Wireless-Fidelity). However, when the mobile terminal communicates using 2G (2nd Generation), 3G, or 4G (4th Generation) wireless access system, the connection to the service server is always made through the Internet.

In addition, a connection may be made to the service server of the cloud service provider through the Internet, by passing (or crossing) a firewall of the company. Particularly in companies having the medium or small size, it may often be difficult to assign a sufficient number of people as system administrators, due to the scale of the company and the budget allowed by the company. In such cases, it may be less expensive not to set up the server within the company, and to instead receive the service using a pay service of the cloud service provider. For this reason, the service server outside the company may be used for the service that does not treat highly confidential information.

Furthermore, when connecting the PC for private or personal use to the service server, the connection is made through the Internet in virtually all cases. The PC for private or personal use is connected through the Internet because there is not much advantage in privately setting up the service server within a home, and because it is more convenient to connect to the service server through the Internet.

Accordingly, it is becoming more general to connect from the mobile terminal or the PC set up at the company or the home, to the service server of the cloud service provider through the Internet.

Figure 2:
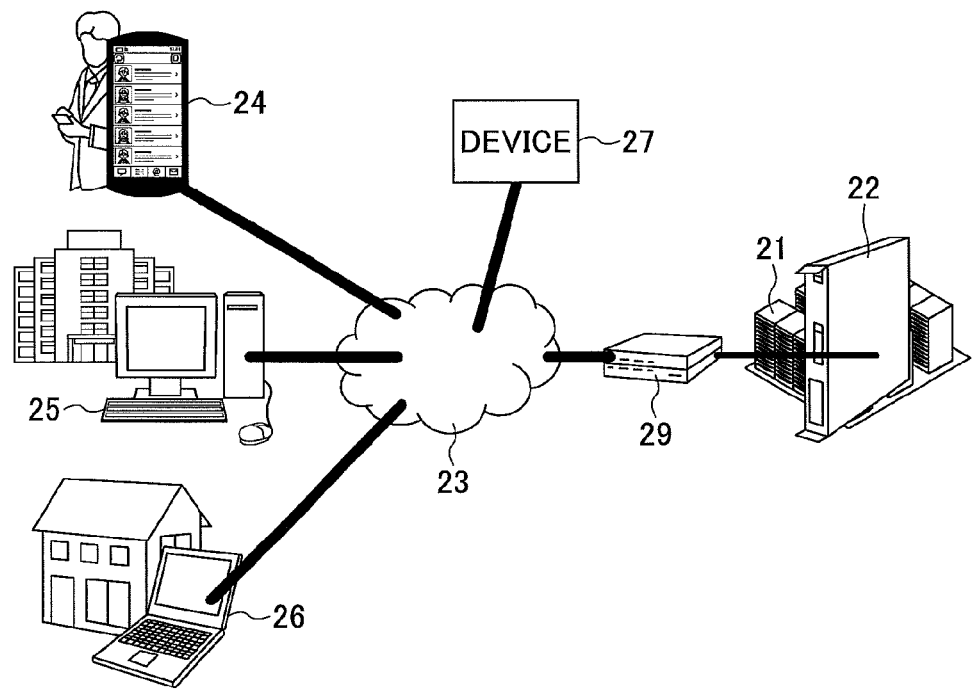
FIG. 2 is a diagram illustrating an example of a configuration for making a connection from the mobile terminal or a PC to the cloud service through the Internet.

FIG. 2 is a diagram illustrating an example of a configuration for making the connection from the mobile terminal or the PC set up at the company or the home to the cloud service through the Internet. In FIG. 2, a server group 21 owned by the cloud service provider is connected to the Internet 23 through a router 29, and provides a service to the user by executing a program. A mobile terminal 24 corresponds 1:1 with one service server 22 within the server group 21 owned by the cloud service provider. Alternatively, in a case in which the service server 22 is virtualized, the mobile terminal 24 corresponds 1:1 with one VM (Virtual Machine) within the service server 22. A plurality of networks may be connected to the Internet 23, and the plurality of networks and the Internet 23 may mutually exchange packets. The mobile terminal 24 is connected to the Internet 23 through the router or the base station of the communication common carrier. A PC 25 within the company is connected to the intranet within the company, and is connected to the Internet 23 through a proxy server or the like for passing (or crossing) the firewall. A PC 26 within the home is connected to the Internet 23 through a public line such as an ADSL (Asymmetric Digital Subscriber Line) and a FTTH (Fiber To The Home).

Other devices 27 are connected to the Internet 23 through other networks. In the case of a device 27 in conformance with the IP (Internet Protocol), the connection to the Internet 23 can basically be made from any location. The device 27 may make a connection to the Internet 23 beyond a boundary, and it is difficult to identify a party to which the device 27 is connected. For this reason, the service server 22 of the cloud service provider is designed on a precondition that the service server 22 may be accessed at any time by the public network.

Figure 3:
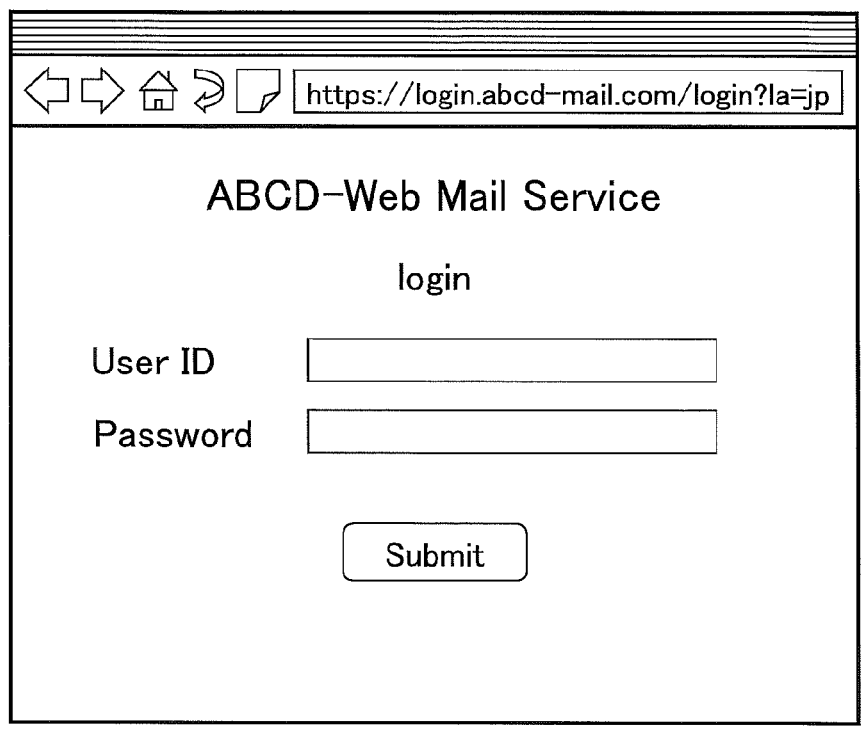
FIG. 3 is a diagram illustrating an example of a user authentication screen.

The service server 22 that may be accessed by the public network stores user's data temporarily or permanently, regardless of whether the cloud service is a pay cloud service or a free cloud service. For this reason, a user authentication is performed by requiring a user ID (Identification) and a password to be input, as illustrated in FIG. 3. FIG. 3 is a diagram illustrating an example of a user authentication screen that is displayed on the mobile terminal 24, the PC 25, and the PC 26. FIG. 3 illustrates the user authentication screen for making a log-in to an ABCD-Web Mail Service.

However, the service server 22 that is connected to the Internet 23 only stores the user ID and the password that are used for the user authentication. Accordingly, an unauthorized third party can make unauthorized access to the service server 22 if the user ID and the password are correct. In addition to this environment in which the unauthorized access may occur, the service server 22 that is connected to the Internet 23 may be access from all over the world. For this reason, when the service server 22 receives a brute force attack or a dictionary attack from a botnet (an aggregate of PCs for making unauthorized access, infected by malware) or the like, there is a possibility that the service server 22 will allow the unauthorized access. In order to prevent such an unauthorized access, it is desirable to use a safer and longer password, such as a character string of 8 or more characters, for example, that is not a dictionary defined word.

When inputting the user ID and the long password in order to connect to the service server 22, the input to the PC 25 and the PC 26 can be made relatively easily from the keyboard. In addition, in the case of the PC 25 and the PC 26, means for reducing the load on the user are provided, such as a substitute input by biometric authentication or authentication using a user's belonging, implementing a plug-in, or the like.

Figure 4:
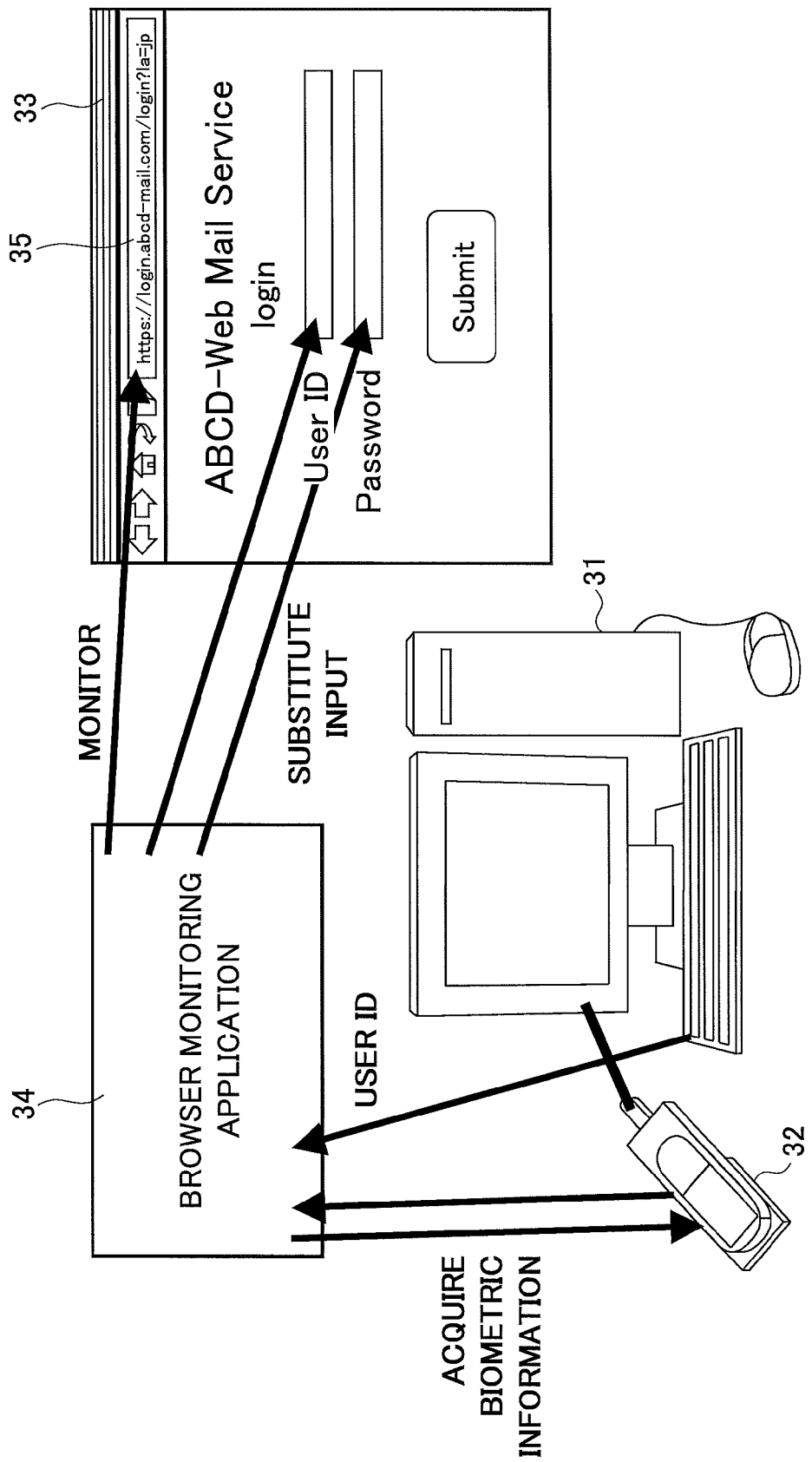
FIG. 4 is a diagram for explaining an example of a load reducing method using a substitute input.

FIG. 4 is a diagram for explaining an example of a load reducing method using the substitute input. A PC 31 illustrated in FIG. 4 corresponds to the PC 25 or the PC 26 illustrated in FIG. 2. A fingerprint sensor 32, which is an example of a biometric sensor, is connected to the PC 31. The fingerprint sensor 32 acquires fingerprint data of a finger, which is an example of user's biometric data, by a known method. The PC 31 includes a browser 33, which is an example of an application, and browses a Web page at a site on the Internet using this browser 33. In addition, the PC 31 includes a browser monitoring application 34, and this browser monitoring application 34 is started when the PC 31 is started to continue an operation in a background. When the browser monitoring application 34 confirms the start of the browser 33, the browser monitoring application 34 confirms a URL 35 for every predetermined time (for example, at approximately 100 msec intervals). Because a URL column of the browser 33 is a window object having an independent window ID, internal text may be acquired by calling a WINDOWS (registered trademark) API (Application Programming Interface). In a case in which the URL acquired in this manner is set to make the substitute input, the PC 31 enters an authentication mode.

In the authentication mode, the PC 31 request the user to input the user ID and to place the user's finger on the fingerprint sensor 32, and acquires the user ID and the biometric data. The acquired biometric data is compared with registered biometric data that are related to user IDs, within the browser monitoring application 35, and the PC 31 enters a substitute input mode when the acquired biometric data matches one of the registered biometric data. In the substitute input mode, the user ID and the password stored within the browser monitoring application 35 are input to a user ID column and a password column of the browser 34, respectively. In a case in which each column is a window object having a window ID, the user ID and the password are input by the WINDOWS (registered trademark) API. On the other hand, in a case in which each column is not the window object having the window ID, the user ID and the password are input by a keyboard emulation.

Figure 5:
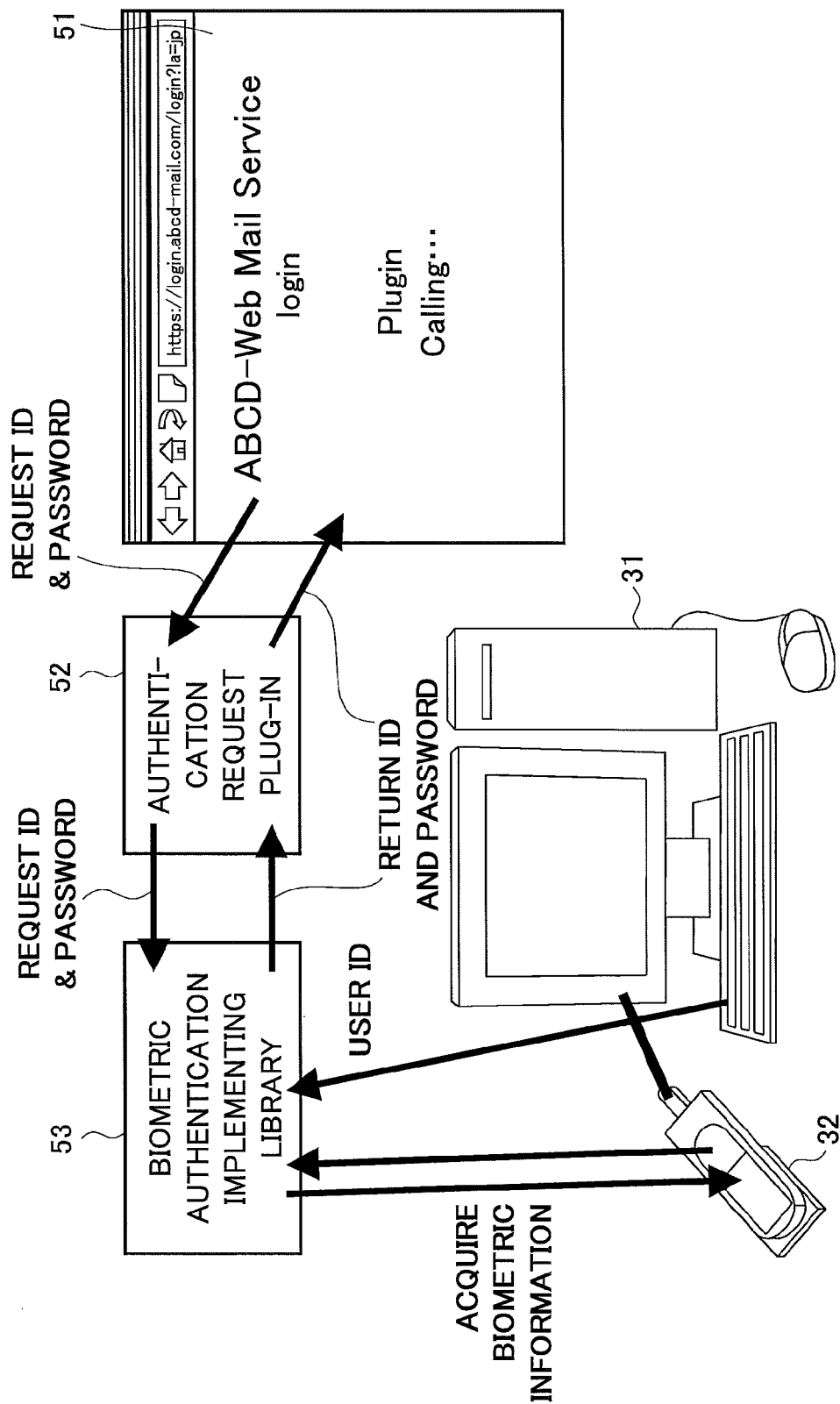

FIG. 5 is a diagram for explaining an example of the load reducing method implementing the plug-in. In FIG. 5, a browser 51 includes a plug-in implementation function to extent functions. In recent browsers for PCs, some type of plug-in implementation function is provided in many cases. An authentication request plug-in 52 which receives an authentication request is a dynamic link library in WINDOWS (registered trademark), and is a shared library in UNIX (registered trademark), and is a kind of library in each case. When a registration is made to the browser according to a specific format, the authentication request plug-in 52 can be called from a script (JAVASCRIPT (registered trademark) or the like) within HTML (Hyper Text Markup Language). For example, the authentication request plug-in 52 lays open to the public a function SetCertAndRequestUserIDAndPassword, for example, to the script. This function enables the user ID and the password to be acquired when a server certifying character string supplied to an argument is obtained from a correct server. In addition, this function is called from the script on the browser 51. In a case in which this function is called, the function of the authentication request plug-in 52 is executed. The authentication request plug-in 52 inspects the server certifying character string supplied from the script, and confirms whether the server certifying character string is obtained from the correct server. In a case in which the authentication request plug-in 52 confirms that the server certifying character string is obtained from the correct server, the authentication request plug-in 52 calls a biometric authentication implementing library 53.

When the biometric authentication implementing library 53 is called, the biometric authentication implementing library 53 displays a dialog requesting the user to input the user ID and to place the user's finger on the fingerprint sensor 32. When the user inputs the user ID in a dialog box and places the user's finger on the fingerprint sensor 32, user's fingerprint data are acquired from the fingerprint sensor 32. The biometric authentication implementing library 53 searches a user information database that is prepared in advance and records pairs of a combination of the user ID and the registered fingerprint data, and the password, based on the user ID that is input. As a result of this search, the biometric authentication implementing library 53 matches the fingerprint data acquired from the fingerprint sensor 32 with the registered fingerprint data that is paired with the user ID matching the user ID that is input, in order to judge whether the matched fingerprint data are generated from the same user's finger. In a case in which the matched fingerprint data are judged as being generated from the same user's finger, the biometric authentication implementing library 53 returns to the authentication request plug-in 52 the user ID, and the password that is paired with the user ID and searched from the user information database.

The authentication request plug-in 52 stores the user ID and the password in variables represented by the argument, as return values of the function SetCertAndRequestUserIDAndPassword. By this return of the function, the script that receives the user ID and the password uses an SSL (Secure Socket Layer) communication and issues a GET command or a POST command during this communication, in order to return the user ID and the password to the server. Hence, it is possible to perform the substitute input of the user ID and the password using the authentication request plug-in 52.

As described above, the load associated with the password input by the user can be reduced by performing the authentication using the biometric sensor 32, and performing the substitute input of the user ID and the password.

Accordingly, when receiving the cloud service by connecting to the service server 22 owned by the cloud service provider, the authentication desirably uses the user ID and the long password that is 8 characters long or longer, for example. In the case of the PC 25 or the PC 26, the user ID and the password can be input relatively easily because the keyboard is provided. Even if the user is unfamiliar with the keyboard operation, the load on the user can be prevented from increasing, because the substitute input of the password and the user ID utilizing the biometric authentication that uses the fingerprint sensor 32 or the like is possible.

Figure 6:
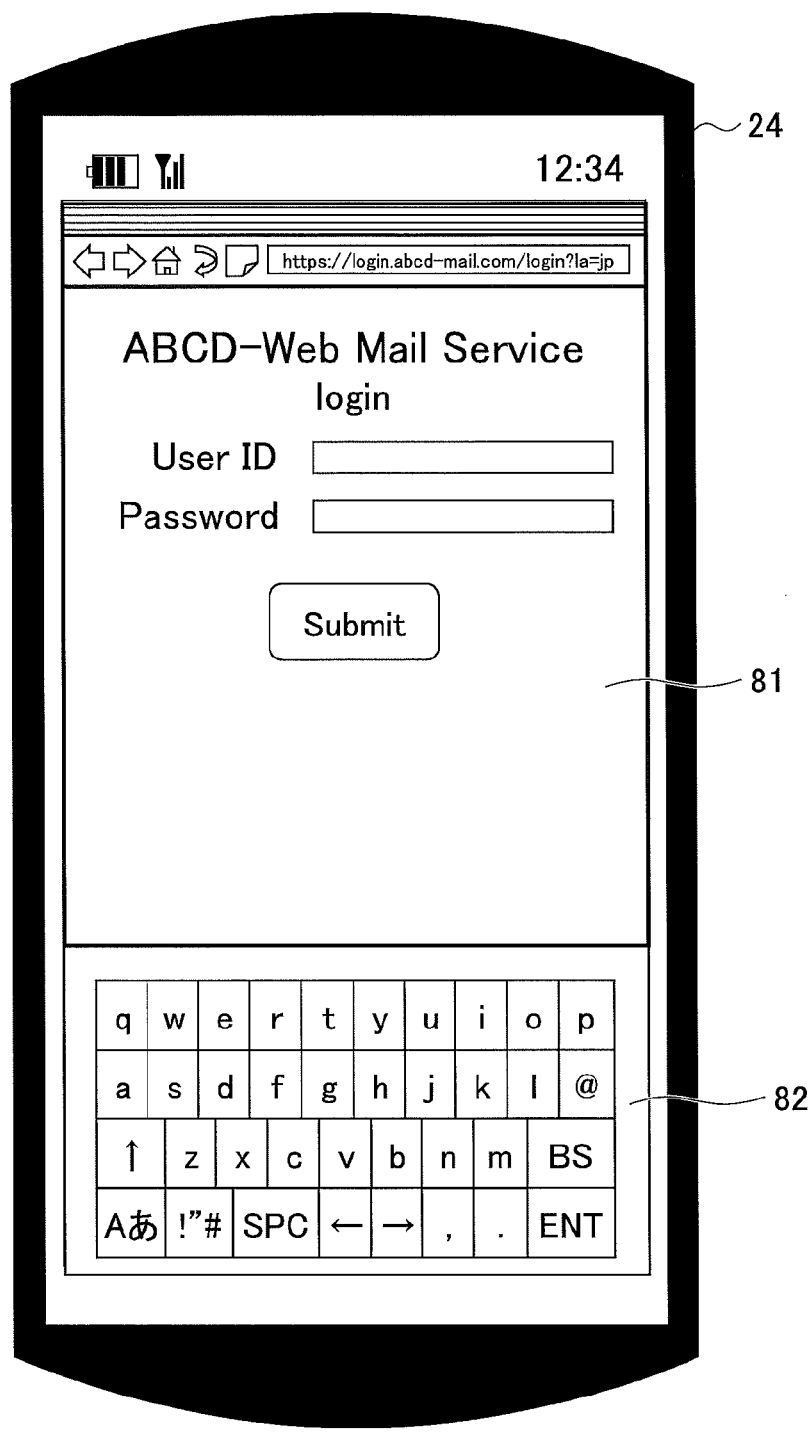
FIG. 6 is a diagram illustrating an example of a user ID and password input screen of the mobile terminal.

On the other hand, when receiving the cloud service by the mobile terminal 24, the load on the user may increase particularly in the case in which a long password needs to be input. FIG. 6 is a diagram illustrating an example of a user ID and password input screen of the mobile terminal. In FIG. 6, a password input screen 81 is an example of a screen that is displayed when the browser of the mobile terminal 24 is connected to the service server 22. In recent years, functions of the browser of the mobile terminal 24 have reached levels similar to those of the PC browser, and thus, display contents of the browser of the mobile terminal 24 are similar to those of the PC browser. A software keyboard 82 is displayed at a lower part of the screen, such as the password input screen 81. The mobile terminal 24 in many cases is not provided with a physical keyboard, and the software keyboard 82 is displayed at the lower part of the screen so that characters or the like can be input from this software keyboard 82. The area of the software keyboard 82 is approximately 55 mm×35 mm in the case of a smartphone having a 4.3-inch liquid crystal screen, for example, and is approximately 93 mm×35 mm in the case of a tablet having a 7-inch liquid crystal screen, for example. Accordingly, the size of a single key of the software keyboard is approximately 5.5 mm×9.0 mm to approximately 9.3 mm×9.0 mm, for example, and small compared to the size of the key on the physical keyboard. Each key is considerably small particularly in the case of the smartphone, and an erroneous input of the character or the like may easily occur even in the case of a skilled user familiar with the smartphone operation. Hence, in the mobile terminal 24, inputting the password is becoming a troublesome and difficult operation for the user, due to the small keys of the software keyboard.

For this reason, in the mobile terminal 24, the biometric authentication and the substitute input may possibly become an authenticating means more effective than in the PC 25 or the PC 26. However, problems preventing the use of such an authenticating means may exist, depending on an OS (Operating System) of the mobile terminal 24. Examples of the OS in which the problems preventing the use of the authenticating means exist include ANDROID (registered trademark), IOS (registered trademark), WINDOWS PHONE 8 (registered trademark), WINDOWS RT (registered trademark), or the like. These problems preventing the use of the authenticating mean relate to various functional restrictions existing in the OS of the mobile terminal 24. It may be regarded that the functional restrictions on the OS of the mobile terminal 24 are more severe than those of the PCs 25 and 26, because the mobile terminal 24 which may always be connected to the Internet preferably has a higher security than those of the PCs 25 and 26 which are often used on the intranet, for example. In addition, it may be regarded that the functional restrictions on the OS of the mobile terminal 24 are more severe than that of the PCs 25 and 26 to prevent rewriting or the like of the applications, in order to protect the business model of the manufacturer or the communication common carrier of the mobile terminal 24.

A first functional restriction prevents the OS of the mobile terminal from performing an inter-process communication between processes. This inter-process communication is used for a communication between the applications, and a communication between the application and a monitoring application such as Daemon or the like. When this inter-process communication cannot be used, the URL monitoring and the substitute input illustrated in FIG. 4 cannot be performed. In WINDOWS (registered trademark), the URL monitoring is performed by calling a function SendMessage, which performs a kind of inter-process communication, by an argument WM_GETTEXT, and acquiring the text in a URL text box of the browser. In addition, in WINDOWS (registered trademark), the substitute input is performed by calling the function SendMessage by the argument WM_SETTEXT, and setting the text in the user ID and/or the password text box of the browser. In other words, when the inter-process communication cannot be performed, the browser monitoring application cannot interfere with the process of the browser, and no substitute input can be performed.

A second functional restriction prevents the browser of the mobile terminal from implementing a plug-in. It may be regarded that this second functional restriction is provided to prevent a security hole which would allow a third party to implement a plug-in, and to prevent the annexed browser from being modified from a viewpoint of maintaining the business model. The use of the plug-in is prohibited in all OSs of the mobile terminal. However, this second functional restriction prevents the substitute input of the user ID and the password by implementing the plug-in as illustrated in FIG. 5. When the plug-in cannot be implemented in the browser, it is impossible to call the function of the plug-in from the script that is executed on the browser, the data for authenticating the server cannot be transferred, and it is of course impossible to receive the user ID and the password.

A third functional restriction prevents a device driver to be added to the OS of the mobile terminal. In the case of the PC, when a peripheral device is connected to an interface, such as a USB or the like, a device driver of this peripheral device can be installed in the PC, and this peripheral device can be controlled through the installed device driver. However, although a device driver of the device annexed by default is implemented in the OS of the mobile terminal, it is impossible to subsequently add a device driver. A USB OTG (On The Go) controller is implemented in many of the mobile terminals, such as the recently developed smartphones, tablets, or the like. The USB OTG controller can become a host and a slave of the USB. For this reason, the mobile terminal can be connected to the PC as a peripheral device, and a keyboard or a USB storage can be connected to the mobile terminal. Device drivers for the USB keyboard and the USB storage are implemented in advance in the mobile terminal, in order to enable connection of the USB keyboard and the USB storage to the mobile terminal. However, a device driver of a special peripheral device, such as a biometric sensor or the like, is not implemented in the mobile terminal. Hence, although the USB keyboard is correctly recognized when the USB keyboard is connected to the mobile terminal and the characters or the like can be input from the USB keyboard, the biometric sensor cannot be correctly recognized when the biometric sensor is connected to the mobile terminal because the device driver of the biometric sensor is not implemented in the mobile terminal, and it is impossible to use the biometric sensor connected to the mobile terminal.

It may be regarded that one reason for prohibiting the device driver to be subsequently added to the OS of the mobile terminal is because the device driver needs to be operated in a privilege mode to execute a privilege command. If a device driver intentionally having a security hole were to be subsequently implemented and a program for attacking this device driver were created, it would become relatively easy for a malicious third party to become a superuser (for example, a root) of the mobile terminal. If the malicious third party were to become the superuser of the mobile terminal, it would enable a program conflicting with the business model of the communication common carrier or the like to be executed on the mobile terminal. It may be regarded that the device driver is prohibited from being subsequently added to the OS of the mobile terminal for the above noted reasons.

As described above, the substitute input and the substitute reply conventionally performed in the PC cannot be performed in the mobile terminal, even though the substitute input by the application and the substitute reply of the user ID and the password by the plug-in would be more useful in the mobile terminal, as compared to the PC which is provided with the physical keyboard. In other words, the biometric authentication, and the substitute input of the user ID and the password combined with the biometric authentication, and the substitute reply (or substitute transfer), that can be performed in the PC, cannot be performed in the mobile terminal. Accordingly, the load on the user of the mobile terminal increases due to the troublesome and time-consuming operation required to input the long password from the software keyboard.

Hence, in one embodiment, an SAML2 (Security Assertion Markup Language 2.0) authentication, and a fingerprint authentication, which is an example of the biometric authentication, are used to make the log-in to the service server of the cloud service provider.

Figure 7:
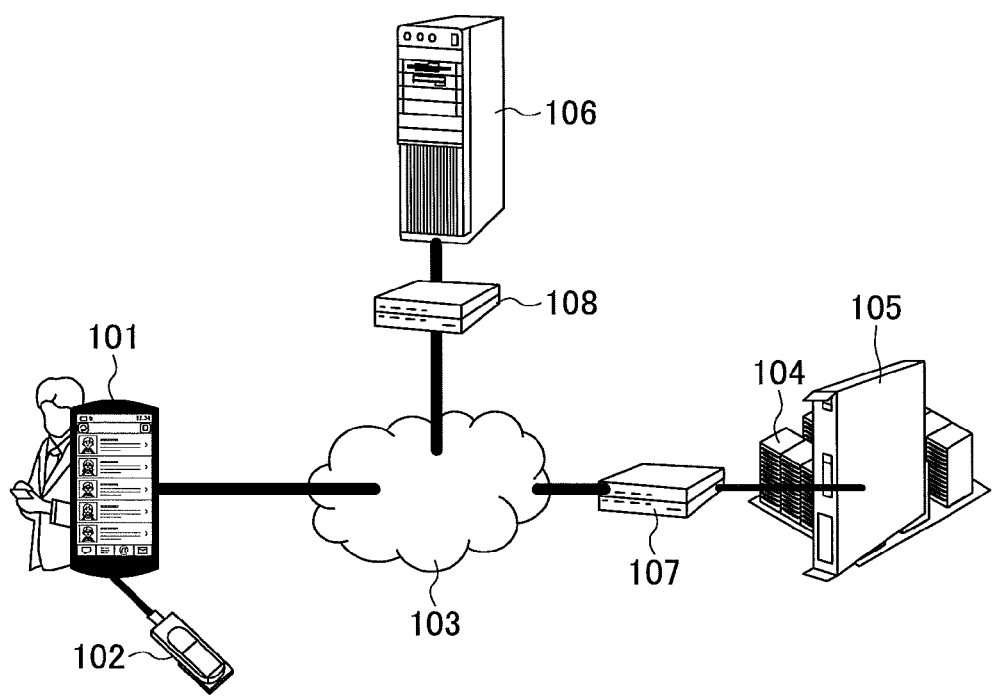
FIG. 7 is a diagram for explaining an example of a secure log-in method in one embodiment.

FIG. 7 is a diagram for explaining an example of a secure log-in method in one embodiment. In this embodiment and each of the embodiments described hereinafter, it is assumed for the sake of convenience that the communication is performed cryptographically in SSL 3.0 (Secure Socket Layer 3.0), TLS 1.0 (Transport Layer Security 1.0), or a communication method capable of providing a higher security than SSL 3.0 or TLS 1.0. HTTP (Hyper Text Transfer Protocol) and self-communication are also similarly performed in SSL/TLS. All communication is performed in SSL/TLS, however, illustration and description thereof will be omitted since the cryptographic technique itself is known.

In FIG. 7, a mobile terminal 101 is an example of a client communicable in a 3G wireless access system such as W-CDMA. The mobile terminal 101 can make a wireless connection to the Internet 103 through a wireless WAN (Wide Area Network) or the like. The mobile terminal 101 can also connect to a USB device. The wireless WAN and the Internet 103 are examples of a network to which the mobile terminal 101 makes the wireless connection. A fingerprint sensor 102, which is an example of the biometric sensor, is formed by a USB device that makes a USB connection to the mobile terminal 101. The fingerprint sensor 102 operates according to instructions from a USB controller of the mobile terminal 101, and acquires fingerprint data of the user's finger that is placed on the fingerprint sensor 102. The Internet 103 is connectable to a plurality of networks, and the Internet 103 and the plurality of networks can mutually communicate by exchanging packets. A data center 104 of the cloud service provider is connected to the Internet 103 through a router 107. A plurality of service servers 105 (only one service server 105 illustrated in FIG. 7 for the sake of convenience) are arranged to provide cloud services to the mobile terminal 101, the PC, or the like. Each of the plurality of service servers 105 provides the cloud services according to requests from a plurality of users. The service server 105 corresponds to an SAML2 (Security Assertion Markup Language 2.0) protocol function on the side of the cloud service provider. An integrated authentication server 106 includes functions of both a biometric authentication part and an SAML2 server IdP (Identity Provider) part that are set up at a location different from that of the data center 104, or at a DMZ (Demilitarized Zone) of the company. The biometric authentication part receives through the Internet 103 the user ID and matching biometric data to be matched, and matches the matching biometric data with registered biometric data in order to determine whether the matched biometric data are generated from the same user's finger. The matching biometric data to be matched are also sometimes referred to as collating biometric data to be collated with the registered biometric data, or as verifying biometric data to be compared with the registered biometric data for verification. The SAML2 server IdP part corresponds to an SAML 2.0 protocol function (hereinafter also referred to as "SAML2 server IdP part") on the side of the IdP. As will be described later, an SAML2 server SP (Service Provider) part of the service server 105 and the SAML2 server IdP part of the integrated authentication server 106 are linked, and the SAML2 server SP part and the SAML2 server IdP part are set so that an approval (or consent) related to the use of the services of the service server 105 is submitted to the integrated authentication server 106. The integrated authentication server 106 is connected to the Internet 103 through a router 108.

The fingerprint sensor 102 may be built into the mobile terminal 101.

First, a description will be given of the biometric authentication part of the integrated authentication server 106. The biometric authentication part receives the user ID and the matching biometric data (matching fingerprint data in this example) from the mobile terminal 101. The integrated authentication server 106 stores a registered biometric data DB (Data-Base), and pairs of the user ID and the registered biometric data are registered in the registered biometric data DB. The biometric authentication part searches the registered biometric data DB using the received user ID, and judges whether the received matching biometric data and the registered biometric data that is paired with the user ID matching the received user ID are generated from the same biometric body (the same user's finger in this example). When the received matching biometric data and the registered biometric data are judged as being generated from the same user's finger as a result of this judging, the biometric authentication part generates an OTP (One Time Password) on the order of 256 bits, for example, from a random number, and registers a temporary user in a temporary user storage part by forming the temporary user from a pair of the user ID and the generated OTP. The registered temporary user is recognized as a registered user by the SAML2 server IdP part of the integrated authentication server 106. However, this registered temporary user is erased from the temporary user storage part in approximately 10 minutes, for example. The biometric authentication part an authentication result indicating a successful authentication and the OTP to the mobile terminal 101 at a transmitting source which transmitted the user ID and the matching biometric data with respect to the integrated authentication server 106. On the other hand, when the received matching biometric data and the registered biometric data are judged as not being generated from the same user's finger as a result of the above judging, or when no matching user ID exists as a result of searching the registered biometric data DB using the received user ID, the biometric authentication part returns to the transmitting source an authentication result indicating an unsuccessful authentication.

Next, a description will be given of the SAML2 server IdP part of the integrated authentication server 106. The SAML 2.0 protocol is formed by two servers and one client. The SAML2 server IdP part provided within the integrated authentication server 106 stores therein a secret key of a public key system cryptographic technique. The integrated authentication server 106 transfers a public key that forms a pair with the secret key to the service server 105 including the SAML2 server SP part whose authentication is to be substituted by the SAML2 server IdP part of the integrated authentication server 106. Thereafter, a substitution request for the authentication is made using the public key.

The SAML2 server IdP part requests the user ID and the password to the mobile terminal 101, according to an authentication substitute request transmitted from the SAML2 server SP part within the service server 105. The SAML2 server IdP part judges whether the pair of the user ID and the password from the mobile terminal 101 matches the pair of the user ID and the password stored therein (pair of user ID and OTP stored in the temporary user storage part in this example), and transmits a judgment result to the SAML2 server SP part of the service server 105.

The service server 105 includes the SAML2 server SP part corresponding to the SAML 2.0 protocol. When the SAML2 server SP part receives the authentication request, the SAML2 server SP part transmits a token that is encrypted using the public key to the SAML2 server IdP part instead of performing the authentication in the SAML2 server SP part itself, in order to submit the user authentication to the SAML2 server IdP part. Such a submission of the user authentication does not require the user ID and the password to be registered with respect to each service each time in a case in which the user requires a plurality of services (for example, a large number of services). As a result, management of the user data for authentication can be facilitated by the so-called SSO (Single Sign On).

The cloud services of the cloud service provider in recent years can cope with SAML2 in most cases. For this reason, employing the SAML2 authentication does not put a load on the user. In addition, by employing the configuration described above, the substitute reply can be performed even when the functional restrictions exist in the OS of the mobile terminal.

Figure 8:
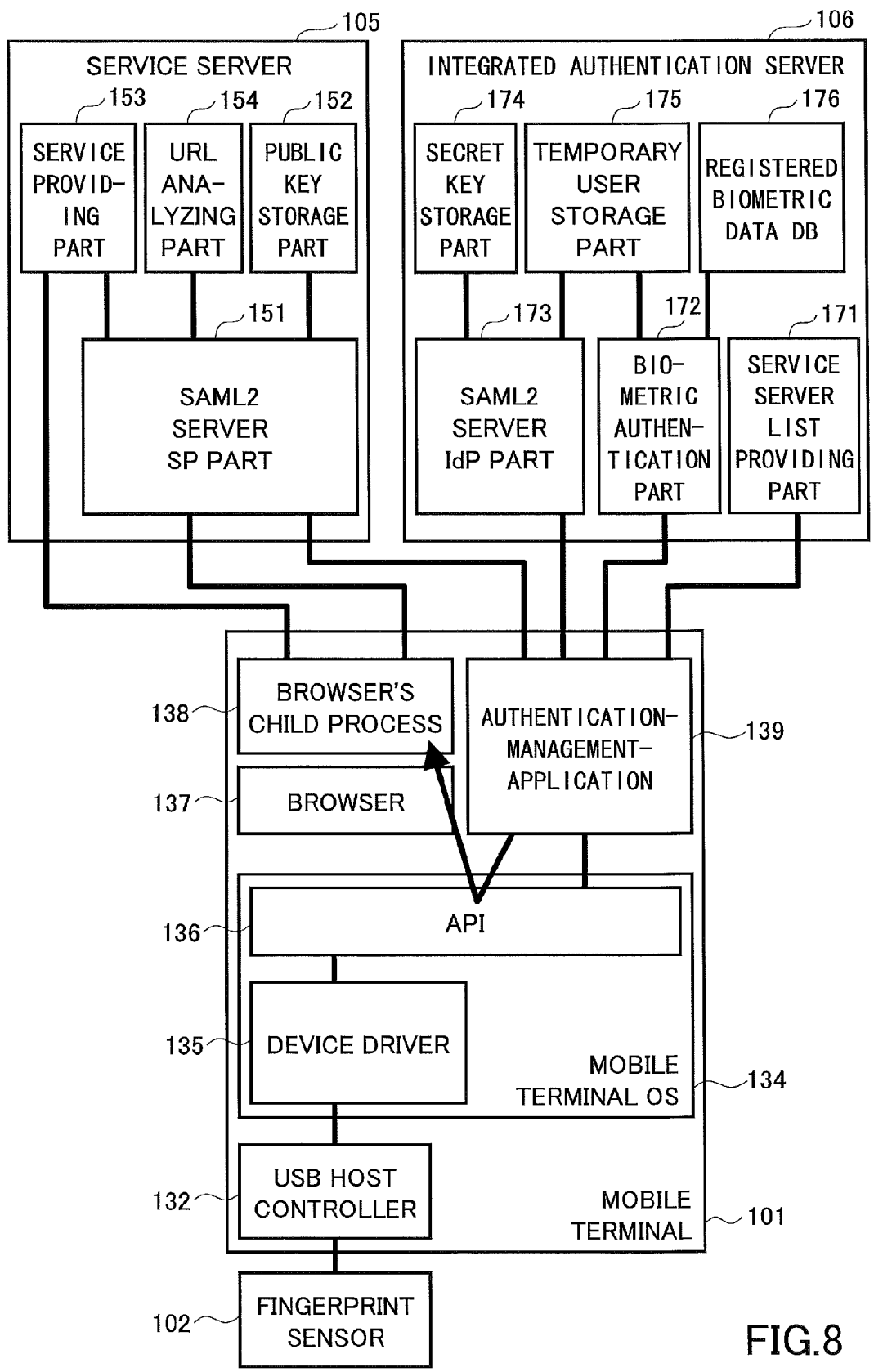
FIG. 8 is a block diagram illustrating an example of configurations of the mobile terminal, a integrated authentication server, and the service server in one embodiment.

FIG. 8 is a block diagram illustrating an example of configurations of the mobile terminal, the integrated authentication server, and the service server in one embodiment. In FIG. 8, illustration of the network 103, the routers 107 and 108, the data center 104, or the like will be omitted.

As illustrated in FIG. 8, the mobile terminal 101 includes a USB host controller 132, an OS 134 of the mobile terminal (hereinafter also referred to as "mobile terminal OS 134"), the browser 137, a child process 138 of the browser 137 (hereinafter also referred to as "browser's child process 138"), and an authentication-management-application 139. A USB slave device, such as a keyboard, a USB storage, or the like, can be connected to the USB host controller 132. In this embodiment, the fingerprint sensor 102, which is an example of the biometric sensor, is connected to the USB host controller 132. A general mobile terminal is in most cases implemented with a USB OTG (USB On The Go) controller which can function either as a USB host controller or a USB slave controller. Accordingly, the USB host controller 132 may be formed by the USB OTG controller, for example. When the user places the user's finger on the fingerprint sensor 102 in a state in which the fingerprint sensor 102 is operating, the fingerprint data of the user's finger is detected by the fingerprint sensor 102 and supplied to the USB host controller 132.

The mobile terminal OS 134 may be formed by ANDROID (registered trademark), IOS (registered trademark), WINDOWS RT (registered trademark), or the like, for example. The mobile terminal OS 134 does not transfer the administrator privilege to the user. As a result, the mobile terminal OS 134 differs from the OS of the PC in that the addition of the device driver, the inter-process communication, the expanding of the browser by the plug-in, or the like are restricted in the mobile terminal OS 134. The mobile terminal OS 134 includes a device driver 135 and APIs 136 of the mobile terminal OS.

The device driver 135 is for driving the USB host controller 132 which is an example of the peripheral device, and provides interfaces for control by APIs. The device driver 135 having such a configuration is provided in the mobile terminal employing the mobile terminal OS, such as ANDROID (registered trademark), IOS (registered trademark), or the like, for example. Hence, the USB host controller 132 can be controlled by calling the API provided by the device driver 135. The APIs provided by the device driver 135 include functions to acquire a connection number and a device name of the USB device that is connected to the mobile terminal 101. It is thus possible to confirm whether the fingerprint sensor 102 is connected to the USB host controller 132.

In a case in which the mobile terminal OS 134 confirms that the fingerprint sensor 102 is connected to the USB host controller 132, a function to write data in the connection number and a function to read data transferred from the connection number and stored in a temporary buffer are prepared as the APIs. The mobile terminal OS 134 uses these functions and issues a command to acquire the fingerprint data of the user's finger with respect to the fingerprint sensor 102. The mobile terminal OS 134 can read the fingerprint data acquired by the fingerprint sensor 102 through the USB host controller 132. In other words, the fingerprint sensor 102 can be called directly from the application to acquire the fingerprint data, without additionally installing the device driver of the fingerprint sensor 102 to the mobile terminal OS 134. Hence, the inconvenience introduced by the third functional restriction described above, namely that the device driver cannot be added to the mobile terminal OS, can be avoided.

The APIs 136 of the mobile terminal OS are APIs provided by the mobile terminal OS 134 with respect to the applications. The APIs 136 of the mobile terminal OS include APIs provided by the device driver 135. The application of the mobile terminal 101 may call the APIs 136 of the mobile terminal OS to acquire resource and information required to execute programs from the mobile terminal OS 134, and to perform various displays, communications, computations, or the like.

The browser 137 may be formed by a browser application that is prepared in advance in the mobile terminal OS 134, for example. The browser 137 may be formed by a plurality of multi-process applications started in the mobile terminal OS 134, for example. The browser 137 perform a process including generating the browser's child process 138, displaying html, or the like, according to a start request requesting the start of the browser 137.

The browser 137 annexed to the mobile terminal OS 134 rejects the inter-process communication that is being executed. However, when starting the browser's child process 138, the browser 137 can accept, as the argument, the inter-process communication from another application. This inter-process communication from another application is permitted by exception, because the browser's child process 138 added with the argument is performed by the inter-process communication. It may be regarded that this exception is permitted to enable the functions that are required to maintain the business model of the mobile terminal 101, such as starting the browser 137 from the URL written in a mail, navigating (or guiding) the user to an application support page, displaying an advertisement homepage when an advertisement is clicked using an advertisement-added application, or the like. Hence, the inconvenience introduced by the first functional restriction described above, namely that the mobile terminal OS 134 is prevented from performing the inter-process communication, can be avoided.

The browser's child process 138 is started through the API calling of the authentication-management-application 139. The browser's child process 138 includes all of the functions of a general browser, including functions to execute and display the cloud services of the service server 105. The browser's child process 138 may be included in the browser 137. Accordingly, the load on the user can be reduced without using the means for reducing the load on the user, such as implementing the plug-in. Hence, the inconvenience introduced by the second functional restriction described above, namely that, the browser 137 of the mobile terminal 101 is prevented from implementing the plug-in, can be avoided.

The authentication-management-application 139 can call the device driver 135 through the API of the mobile terminal OS 134, and transmit data directly to and receive data directly from the fingerprint sensor 102 that is connected to the USB host controller 132 through the device driver 135. For this reason, the fingerprint sensor 102 can be controlled by transmitting command data directly to the fingerprint sensor 102. In addition, the authentication-management-application 139 can acquire the OTP from the integrated authentication server 106 when the user authentication is successful, by transmitting the fingerprint data to be matched together with the user ID to the integrated authentication server 106 and requesting the user authentication. Moreover, the authentication-management-application 139 can request the service server 105 to provide a service, and redirect authentication data in conformance with SAML2 (hereinafter also referred to as "SAML2 data") returned from the service server 105 as a result of this request, to the integrated authentication server 106. On the other hand, the authentication-management-application 139 can also redirect the SAML3 data transmitted from the integrated authentication server 106 to the service server 105. Details of the authentication-management-application 139 will be described later in the specification.

The service server 105 is one of the plurality of service servers owned by the cloud service provider. For example, devices such as the router 107, the load balancer, or the like may be provided between the service server 105 and the Internet 103. The service server 105 provides cloud services to the browser of the user's PC or mobile terminal. The service server 105 also includes a function to perform user authentication. As illustrated in FIG. 8, the service server 105 includes an SAML2 server SP part 151, a public key storage part 152, a service providing part 153, and a URL analyzing part 154.

The SAML2 server SP part 151 receives a service providing request in HTTPS (HyperText Transfer Protocol Secure) from the application or the browser 137 of the mobile terminal 101. When the SAML2 server SP part 151 receives the service providing request, the SAML2 server SP part 151 first transfers a message of the service providing request to the URL analyzing part 154, in order to acquire the URL of the integrated authentication server 106. The URL of the integrated authentication server 106 is an example of information specifying the integrated authentication server 106. Next, the SAML2 server SP part 151 generates a character string of an authentication request message, and a random number character string for a long challenge-and-response, that is, a nonce. In addition, the SAML2 server SP part 151 transfers the URL of the integrated authentication server 106 to the public key storage part 152 and acquires the public key forming a pair with this URL, in order to encrypt, using the acquired public key, the character string of the authentication request message and the nonce that are generated.

Further, the SAML2 server SP part 151 returns the encrypted data in HTTPS to the mobile terminal 101 so as to be redirected to the integrated authentication server 106. The SAML2 server SP part 151 performs such communication with an SAML2 server IdP part 171 of the integrated authentication server 106 several times, through the browser 137 or the application, and notifies a start of providing the service to the service providing part 153 when a message indicating a successful authentication is received from the SAML2 server IdP part 171. The service providing part 153 provides the service to the browser's child process 138 of the mobile terminal 101.

The public key storage part 152 stores the public key forming a pair with the secret key stored in the integrated authentication server 106. Because the service server 105 copes with users belonging to a large number of companies, organizations, or the like, for example, the public key storage part 152 stores the public key forming a pair with the URL of the SAML2 server SP part 151 of the service server 105. Hence, when the URL is transferred to the public key storage part 152, the public key storage part 152 provides the public key corresponding to the URL.

The service providing part 153 provides the cloud services provided by the cloud service provider to the mobile terminal 101. The URL analyzing part 154 analyzes the message of the service providing request transmitted from the authentication-management-application 139, and computes the URL of the integrated authentication server 106. The URL used to make a connection to the service server 105 in many cases includes the URL of the integrated authentication server 106. In such cases, the URL analyzing part 154 returns the URL of the integrated authentication server 106, included in the URL, to the mobile terminal 101, in response to the message of the service providing request. In the case of the service server 105 which relates the user ID and the authentication server, the URL analyzing part 154 searches the URL of the integrated authentication server 106 using the user ID as a key (or index), and returns to the mobile terminal 101 the URL of the integrated authentication server 106 that is retrieved as a result of the search.

On the other hand, the integrated authentication server 106 includes functions of both an SAML2 server part and a biometric authentication part (fingerprint authentication part in this example). As illustrated in FIG. 8, the integrated authentication server 106 includes a service server list providing part 171, a biometric authentication part 172, an SAML2 server IdP part 173, a secret key storage part 174, a temporary user storage part 175, and a registered biometric data DB 176.

The service server list providing part 171 returns to the mobile terminal 101 the name of the service, and the list of URLs of the service servers 105 providing this service. The mobile terminal 101 connects to the service server list providing part 171 when started, and acquires the list of the pairs of names of services provided to the user and the URLs of the service servers 105. The URL of the service server 105 is an example of information specifying the service server 105. The user can select one service the user decides to use, from the list acquired by the mobile terminal 101.

The biometric authentication part 172 searches the registered biometric data DB 176 using the user ID as the key (or index), when the user ID and the matching biometric data (matching fingerprint data in this example) to be matched are transmitted from the mobile terminal 101. In a case in which a user ID identical to the user ID that is used as the key is registered in the registered biometric data DB 176, the registered biometric data that forms a pair with this registered user ID and is registered in the registered biometric data DB 176 is returned to the biometric authentication part 172. The biometric authentication part 172 judges by computation whether the matching biometric data and the registered biometric data are generated from the same biometric body (the same user's finger in this example). In a case in which the matching biometric data and the registered biometric data are judged as being generated from the same biometric body, the biometric authentication part 172 generates the OTP on the order of 256 bits, for example. The biometric authentication part 172 stores the generated OTP together with the user ID in the temporary user storage part 175. The pair of the user ID and the OTP stored in the temporary user storage part 175 is erased after 10 minutes, for example. The biometric authentication part 172 returns to the mobile terminal 101 an authentication result indicating a successful authentication, together with the OTP. On the other hand, in a case in which the matching biometric data and the registered biometric data are judged as not being generated from the same user's finger, the biometric authentication part 172 generates no OTP, and turns to the mobile terminal 101 an authentication result indicating an unsuccessful authentication.

The SAML2 server IdP part 173 analyzes the encrypted data transmitted from the SAML2 server SP part 151 of the service server 105 through the mobile terminal 101. The SAML2 server IdP part 173 decrypts the encrypted data using the secret key stored in the secret key storage part 174, and confirms whether the character string of the authentication request message is correctly decrypted. In a case in which the character string of the authentication request message is correctly decrypted, the SAML2 server IdP part 173 transmits a request for the user ID and the password as a reply to the redirecting of the mobile terminal 101. When the user ID and the password that are requested are transmitted from the mobile terminal 101, the SAML2 server IdP part 173 searches the temporary user storage part 175, in order to confirm whether the pair of the user ID and the password identical to the pair of the user ID and the password is stored in the temporary user storage part 175. When the user ID and the password identical to those transmitted from the mobile terminal 101 exist in the temporary user storage part 175, the SAML2 server IdP part 173 generates an SAML authentication response message, and encrypts the SAML authentication response message using the secret key. In addition, the SAML2 server IdP part 173 redirects the encrypted SAML authentication response message through the mobile terminal 101 when making the reply, so that the encrypted data reaches the service server 105. As will be described in more detail later in the specification in conjunction with the description on the authentication-management-application 139, when returning the encrypted SAML authentication response message to the mobile terminal 101, the authentication-management-application 139 does not redirect as instructed. Instead, the authentication-management-application 139 generates the browser's child process 138, and controls the browser's child process 138 to redirect. Hence, the process thereafter can be performed by the browser's child process 138. The SAML2 server SP part 151, which receives the encrypted SAML2 authentication response message from the browser's child process 138, decrypts the encrypted SAML2 authentication response message and then confirms whether the SAML2 authentication response message is correctly decrypted. When the SAML2 authentication response message is correctly decrypted, the operation of the service server 105 moves to the providing of the services by the service providing part 153.

The secret key storage part 174 stores the secret key, of the pair of the public key and the secret key generated when the integrated authentication server 106 is started. The temporary user storage part 175 stores the pair of the user ID of the user who is permitted to receive the service that is provided, and the password, when the biometric authentication (fingerprint authentication in this example) is successful. The SAML2 server IdP part 173 refers to the temporary user storage part 175, and confirms whether the pair of the user ID and the password transmitted from the mobile terminal 101 matches the pair of the user ID and the password stored in the temporary user storage part 175. Such a 2-stage process is performed in order to prevent modifications or alterations to the SAML2 server IdP part 173. The registered biometric data DB 176 stores a plurality of pairs of user IDs and registered biometric data. The user IDs of a plurality of users who are permitted to use the cloud service, and the registered biometric data (registered fingerprint data in this example) are registered in the registered biometric data DB 176.

Figure 9:
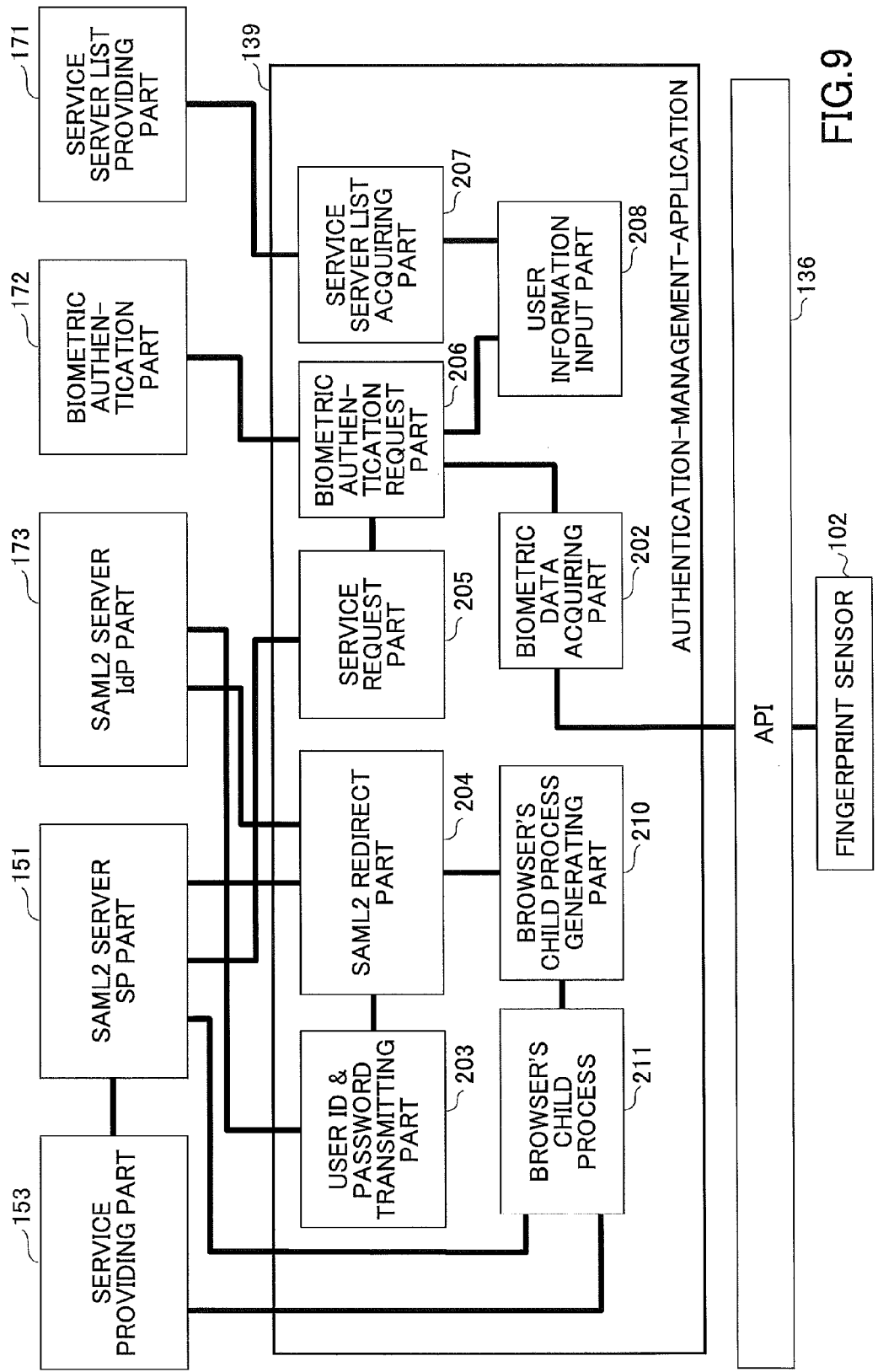
FIG. 9 is a block diagram illustrating an example of a configuration of authentication-management-application.

Next, a more detailed description will be given of the authentication-management-application 139 of the mobile terminal 101, by referring to FIG. 9. FIG. 9 is a block diagram illustrating an example of a configuration of the authentication-management-application. In FIG. 9, those parts that are the same as those corresponding parts in FIG. 8 are designated by the same reference numerals, and a description thereof will be omitted.

As illustrated in FIG. 9, the authentication-management-application 139 includes a biometric data acquiring part 202, a user ID and password transmitting part 203, an SAML2 redirect part 204, a service request part 205, a biometric authentication request part 206, a service server list acquiring part 207, a user information input part 208, a browser's child process generating part 210, and a browser's child process 211.

In the authentication-management-application 139, the service server list acquiring part 207 first connects to the service server list providing part 171 of the integrated authentication server 106, and acquires the list of pairs of service names and URLs of the service servers. The service server list acquiring part 207 stores the acquired list of the pairs of the service names and the URLs in a memory within the service server list acquiring part 207. In addition, the service server list acquiring part 207 transfers the acquired list of the service names to the user information input part 208.

The user information input part 208 displays the acquired list of the service names, and urges the user to select the service name of the service to be used from the list of the service names. Further, the user information input part 208 urges the user to input the user ID of the user. When the user information input part 208 acquires the service name selected by the user and the user ID input by the user, the user information input part 208 stores the acquired service name and the acquired user ID in a memory within the user information input part 208.

Next, the biometric data acquiring part 202 urges the user to place the user's finger on the fingerprint sensor 102. At the same time, the biometric data acquiring part 202 drives the fingerprint sensor 102 through the API 136 of the mobile terminal OS. The biometric data acquiring part 202 acquires the fingerprint data detected from the user's finger by the fingerprint sensor 102, and stores the acquired fingerprint data in a memory of the biometric data acquiring part 202. As described above, the fingerprint data is an example of the matching biometric data to be matched with the registered biometric data.

Next, the biometric authentication request part 206 transmits the matching biometric data stored in the memory of the biometric data acquiring part 202 and the user ID stored in the memory of the user information input part 208 to the biometric authentication part 172 of the integrated authentication server 106, in order to search the registered biometric data that is paired with the user ID in the biometric authentication part 172. The biometric authentication part 172 matches the matching biometric data with the registered biometric data that is retrieved by the search. In a case in which the biometric authentication part 172 judges that the registered biometric data and the matching biometric data are generated from the same user's finger, the biometric authentication request part 206 receives a notification indicating a successful authentication, and the OTP, from the biometric authentication part 172. The biometric authentication request part 206 stores the received OTP in a memory of the biometric authentication request part 206.

When the biometric authentication request part 206 receives the notification indicating the successful authentication, the biometric authentication request part 206 notifies a start of requesting the service to the service request part 206. The service request part 205 makes a service providing request in HTTPS with respect to the URL of the service server 105 paired with the service name selected by the user. The SAML2 server SP part 151 of the service server 105 returns a response by the SAML2 protocol with respect to the service providing request.

The SAML2 protocol is a relatively complex protocol that transmits data according to the SAML2 while implementing the SOAP (Simple Object Access Protocol) on the HTTPS. However, the mobile terminal 101 merely performs a redirect process to relay the data from the SAML2 server SP part 151 to the SAML2 server IdP part 173, and to relay the data from the SAML2 server IdP part 173 to the SAML2 server SP part 151. Hence, the mobile terminal 101 does not need to analyze the contents of the data. In addition, the redirect process itself can be performed in the SAML2 redirect part 204 according to either one of the following two kinds of methods, for example.

A first method utilizes a "Location:" description within an HTTP response header that is returned from the service server 105, when the service providing request is made to the service server 105. When performing the redirect process, the following description exists within the HTTP response header, for example.

Location: https://idp.example.com/SAML/Browser?SAMLRequest=fVFdS8MwFH0f7D%2BUvGd-Nsq62oSsIQyhMESc%2B%2BJYlmRbWpObe
yvz3puv2IMjyFM7HPedyK1DdsZdb%2F%2BEHfLFfg-wVMTt3RgTwzazI
EJ72CFqRTnQWJWu7uH7dSLJjsg0ev%2FZFM1tti-BWADtt6R%2BSyJr9
msiRH7O70sCm31Mj%2Bo%2BC%2B1KA5GlEWeZao-gSQMw2MYBKodrIhj
LKONU8FdeSsZkVr6T5M0GiHMjvWCknqZXZ2OoP-xF7kGnaGOuwxZ%2Fn
4L9bY8NC%2By4du1XpRXnxPcXizSZ58KFTeHuj-EWkNPZylsh9bAMYYU
jO2Uiy3jCpTCMo5M1StVjmN9SO150sl9lU6RV2D-p0vsLIy7NM7YU82r
9B90PrvCf85W%2FwL8zSVQzAEAAA%3D%3D&RelayState=0043bfc1bc45110dae17004005b13a2b&SigAlg=http %3A%2F%2Fwww.w3.org%2F200%2F09%2Fxmldsig-%23rsashal &Signature=NOTAREALSIGNATUREBUTTHEREALONE-WOULDGOHERE In a case in which the "Location:" description described above exists within the HTTP response header, a secure socket is connected in SSL/TLS at a predetermined port number of a domain name server idp.example.com, for example, since the description is in https. In addition, a GET command is issued again so that the remaining data part is transmitted. More particularly, a command GET/SAML/Browser?SAMLRequest=fVFdS8 . . . GOHERE is transmitted.

A second method utilizes a "Refresh" description of meta data <meta http-equiv="Refresh" content="0; URL=https://idp.example.com/SAML/Browser?SAMLRequest= . . . GOHERE"/> existing within an html body surrounded by header parts <head> and </head>. In a case in which the "Refresh" description of the meta data exists within the html body surrounded by the header parts and subsequent to the HTTP response header, only the URL part within the "Refresh" description is analyzed, and an SSL/TLS secure socket connection is made to "URL=" within "content=". In addition, the GET command is issued, similarly as in the case of the first method described above. More particularly, the command GET/SAML/Browser?SAML Request=fVFdS8 . . . GOHERE is transmitted.

By the procedures described above, the SMAL2 redirect part 204 relays the data between the SAML2 server SP part 151 and the SAML2 server IdP part 173. The SAML2 server SP part 151 and the SAML2 server IdP part 173 can establish a mutually trusting relationship using the public key and the secret key stored therein. After the SAML2 server SP part 151 and the SAML2 server IdP part 173 establish the mutually trusting relationship, the SAML2 server IdP part 173 returns to the SAML2 redirect part 204 a response to the redirect process, that is, the html that displays a screen requesting the user ID and the OTP. The SAML2 redirect part 204 discards the html that displays the user ID and the OTP, and instead instructs the user ID and password transmitting part 203 to transmit the user ID and the password to the SAML2 server IdP part 173.

The user ID and password transmitting part 203 transmits the user ID and the OTP stored in the temporary user storage part 175 to the SAML2 server IdP part 173. For example, in a state in which a relatively long time of 10 minutes or longer, for example, is not yet elapsed, the pair of the user ID and the OTP is always stored in the temporary user storage part 175. From a time when the biometric authentication (fingerprint authentication in this example) ends and the pair of the user ID and the OTP is stored in the temporary user storage part 175 until a time when the control is transferred to the user ID and password transmitting part 203, it only takes a relatively short time on the order of less than 1 second, for example. For this reason, the authentication of the user ID and the OTP in the SAML2 server IdP part 173 will always succeed timewise. Accordingly, a URL-added SAML authentication response message for permitting the log-in to the service server 105, including the URL of the service server 105, is transmitted to the SAML2 redirect part 204.

After instructing the user ID and password transmitting part 203 to transmit the user ID and the OTP, the SAML2 redirect part 204 itself does not redirect the SAML2 communication first transmitted from the SAML2 server IdP part 173, and transfers the SAML2 communication contents to the browser's child process generating part 210. After transferring the SAML2 communication contents to the browser's child process generating part 210, the SAML2 redirect part 204 disconnects the communication of the service server 105 and the integrated authentication server 106.

More particularly, the browser's child process generating part 210 generates the browser's child process 211 by calling, with the SAML2 communication contents, the API 136 of the mobile terminal OS. For example, in the mobile terminal OS such as ANDROID (registered trademark), an activity can be started by a startActivity function by creating the browser's child process 211 by a new Intent instruction, using the SAML2 communication contents ("https://sp.example.com/ . . . ").

```
Uri uri = Uri.parse("https://sp.example.com/SAML/
    Browser?SAMLResponse=asDCvDSf....");
Intent browserIntent;
browserIntent = new Intent(Intent.ACTION_VIEW,uri);
startActivity(browserIntent);
```

The browser's child process 211 starts the activity by the startActivity function, and connects to the SAML2 server SP part 152 of the service server 105 according to the SAML2 communication contents. In the case of a general client-server communication, both the server and the client continue the communication and the process by maintaining the respective states while the communication is being made. In a case in which the communication is interrupted, the states of the server and the client are reset, and the communication is restarted from the beginning. However, in the case of the HTTP, the so-called stateless communication and process are performed in which the server and the client do not have states, in order to enable the communication to continue even when the line is unstable. Since the SAML implemented in the HTTP is also a stateless protocol, when a reconnection is made from the browser's child process 211, the transmitted URL-added SAML authentication response message is interpreted and the process is resumed thereon after.

The SAML2 server SP part 152 which receives the URL-added SAML authentication response message outputs a permission permitting the service providing part 153 to provide services, and instructs a response to be made to the mobile terminal 101. The service providing part 153 starts providing the services with respect to the browser's child process 211.

Figure 10:
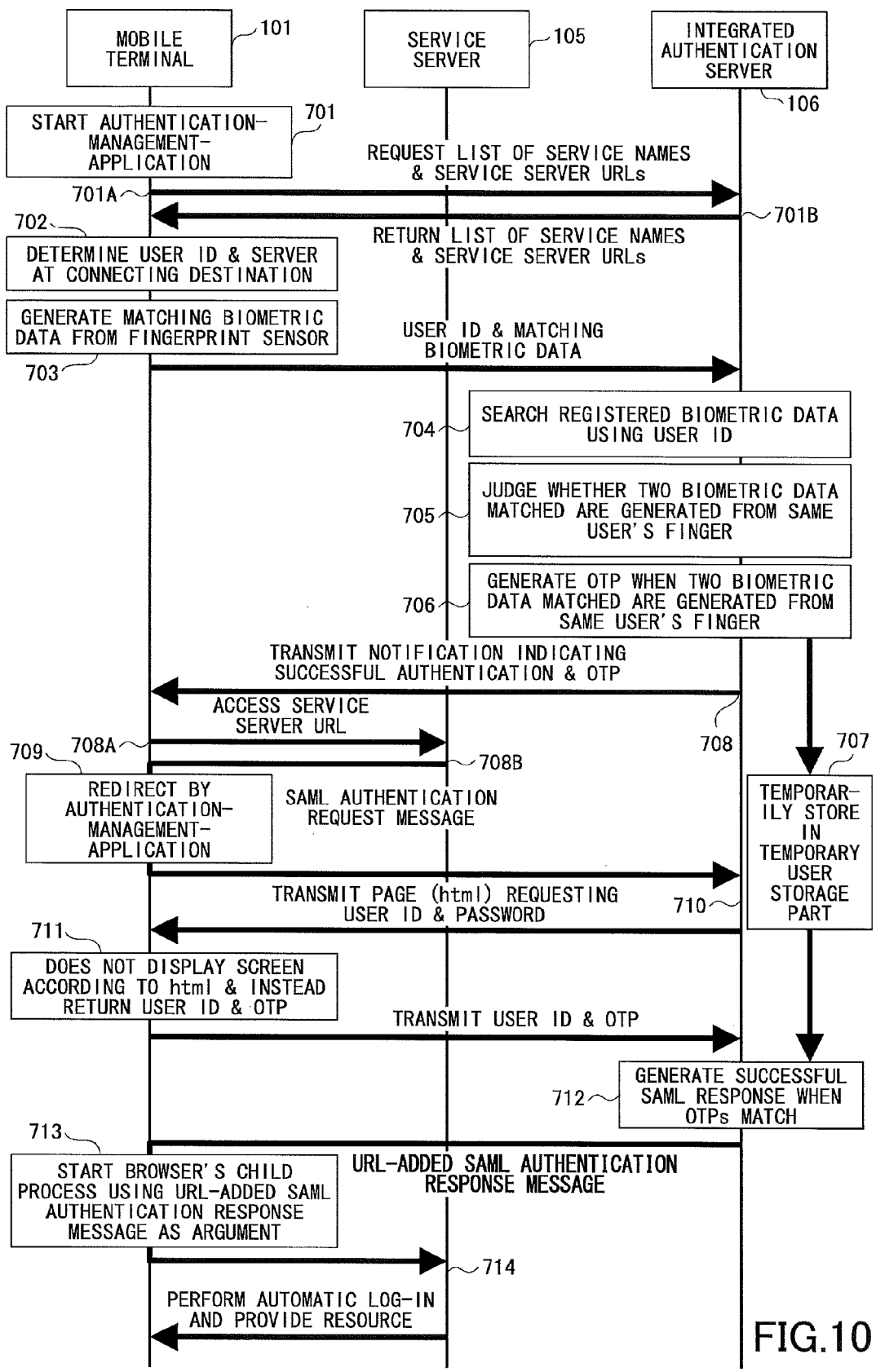
FIG. 10 is a diagram for explaining an example of a secure log-in process in one embodiment.

Next, a description will be given of an operation sequence of the mobile terminal, the service server, and the integrated authentication server, by referring to FIG. 10. FIG. 10 is a diagram for explaining an example of a secure log-in process in one embodiment. In FIG. 10, processes of steps 701, 701A, 702, 703, 708A, 709, 711, and 713 are executed by a processor of the mobile terminal 101. Processes of steps 708B and 714 are executed by a processor of the service server 105. In addition, processes of steps 701B, 704, 705, 706, 606, 708, 710, and 712 are executed by a processor of the integrated authentication server 106.

The mobile terminal 101, in step 701, starts the authentication-management-application 139. When the authentication-management-application 139 of the mobile terminal 101 is started, the service server list acquiring part 207, in step 701A, connects to the integrated authentication server 106 and requests the list of the service names and the service server URLs. The service server list providing part 171 of the integrated authentication server 106, in step 701B, returns the requested list of the service names and the service server URLs to the mobile terminal 101, and thus, the mobile terminal 101 acquires the requested list of the service names and the service server URLs and transfers this list to the user information input part 208.

The user information input part 208 of the mobile terminal 101, in step 702, urges the user to input the user ID, and further urges the user to select the service to be used. Hence, the user ID input by the user, and the service server 105 at the connecting destination which provides the service selected by the user are determined in the mobile terminal 101.

The mobile terminal 101, in step 703, controls the fingerprint sensor 102 from the biometric data acquiring part 202 through the USB host controller 132 to generate the matching biometric data by reading the fingerprint data of the user's finger, and transmits user ID and the matching biometric data from the biometric authentication request part 206 to the integrated authentication server 106.

The biometric authentication part 172 of the integrated authentication server 106, in step 704, searches the registered biometric data DB 176 using the user ID, to acquire the registered biometric data that is paired with a user ID identical to the user ID received from the biometric authentication request part 206. The integrated authentication server 106, in step 705, matches the matching biometric data with the registered biometric data, to judge whether the matched biometric data are generated from the same biometric body, that is, the same user's finger. The biometric authentication part 172 of the integrated authentication server 106, in step 706, generates the OTP having a length on the order of 256 bits, for example, when the matching biometric data and the registered biometric data that are matched are judged as being generated from the same user's finger. The biometric authentication part 172 of the integrated authentication server 106, in step 707, temporarily stores in the temporary user storage part 175 for only a predetermined time the OTP by pairing the OTP with the user ID. When the predetermined time on the order of 10 minutes, for example, elapses, the pair of the user ID and the OTP is erased from the temporary user storage part 175, and the SAML2 server IdP part 173 searches the temporary user storage part 175 as a database of the user data for authentication. In addition, the biometric authentication part 172 of the integrated authentication server 106, in step 708, transmits a notification indicating a successful authentication, and the OTP, to the mobile terminal 101. The notification indicating the successful authentication indicates that the matching biometric data and the registered biometric data that match are generated from the same user's finger.

The mobile terminal 101, in step 708A, requests access to a resource (or requests target resource) by the service server URL, from the service request part 205 to the service server 105, when the biometric authentication request part 206 receives the notification indicating the successful authentication and the OTP. The SAML2 server SP part 151 of the service server 105, in step 708B, sets the integrated authentication server 106 as a final destination server, and transmits the SAML authentication request message to redirect to the mobile terminal 101.

The SAML2 redirect part 204 of the mobile terminal 101, in step 709, redirects the SAML authentication request message (or authentication request) to the integrated authentication server 106, in response to a redirect instruction of the SAML authentication request message, and relays the data between the SAML2 server SP part 151 and the SAML2 server IdP part 173.

The SAML2 server IdP part 173 of the integrated authentication server 106, in step 710, transmits to the mobile terminal 101 a page (html page) which urges (or requests) the user to input the user ID and the password, that is, a screen for transmitting the user ID and the password to the integrated authentication server 106, when the SAML2 server IdP part 173 receives the SAML authentication request message.

The SAML2 redirect part 204 of the mobile terminal 101, in step 711, does not display a screen according to the received html page, and instead returns to the integrated authentication server 106 the user ID input by the user and the OTP that is already received.

The SAML2 server IdP part 173 of the integrated authentication server 106, in step 712, confirms whether the pair of the received user ID and the OTP is stored in the temporary user storage part 175. In a case in which the predetermined time on the order of 10 minutes, for example, is not yet elapsed, the pair of the user ID and the OTP that are received are stored in the temporary user storage part 175, and in this case, the OTPs match. When the OTPs match, the SAML2 server IdP part 173 of the integrated authentication server 106, in step 712, returns the URL-added SAML2 authentication response message, including the URL of the service server 105, to the mobile terminal 101 (that is, respond with assertion), in order to redirect to the service server 105.

The SAML2 redirect part 204 of the mobile terminal 101, in step 713, does not redirect the received URL-added SAML2 authentication response message, and disconnects the communication session with the integrated authentication server 106. In addition, the browser's child process generating part 210 of the mobile terminal 101, in step 713, starts the browser's child process 211 using the URL-added SAML2 authentication response message as the argument, so that the subsequent processes are performed by the browser's child process 211. The browser's child process 211, when started, transmits the URL-added SAML2 authentication response message to the service server 105.

The SAML2 server SP part 151 of the service server 105, in step 714, recognizes that the substitute authentication is successful when the URL-added SAML authentication response message is received, and performs an automatic log-in in order to provide the service (resource, operation, or the like) of the service server 105 to the browser's child process 211 of the mobile terminal 101 (respond with request resource).

Figure 11:
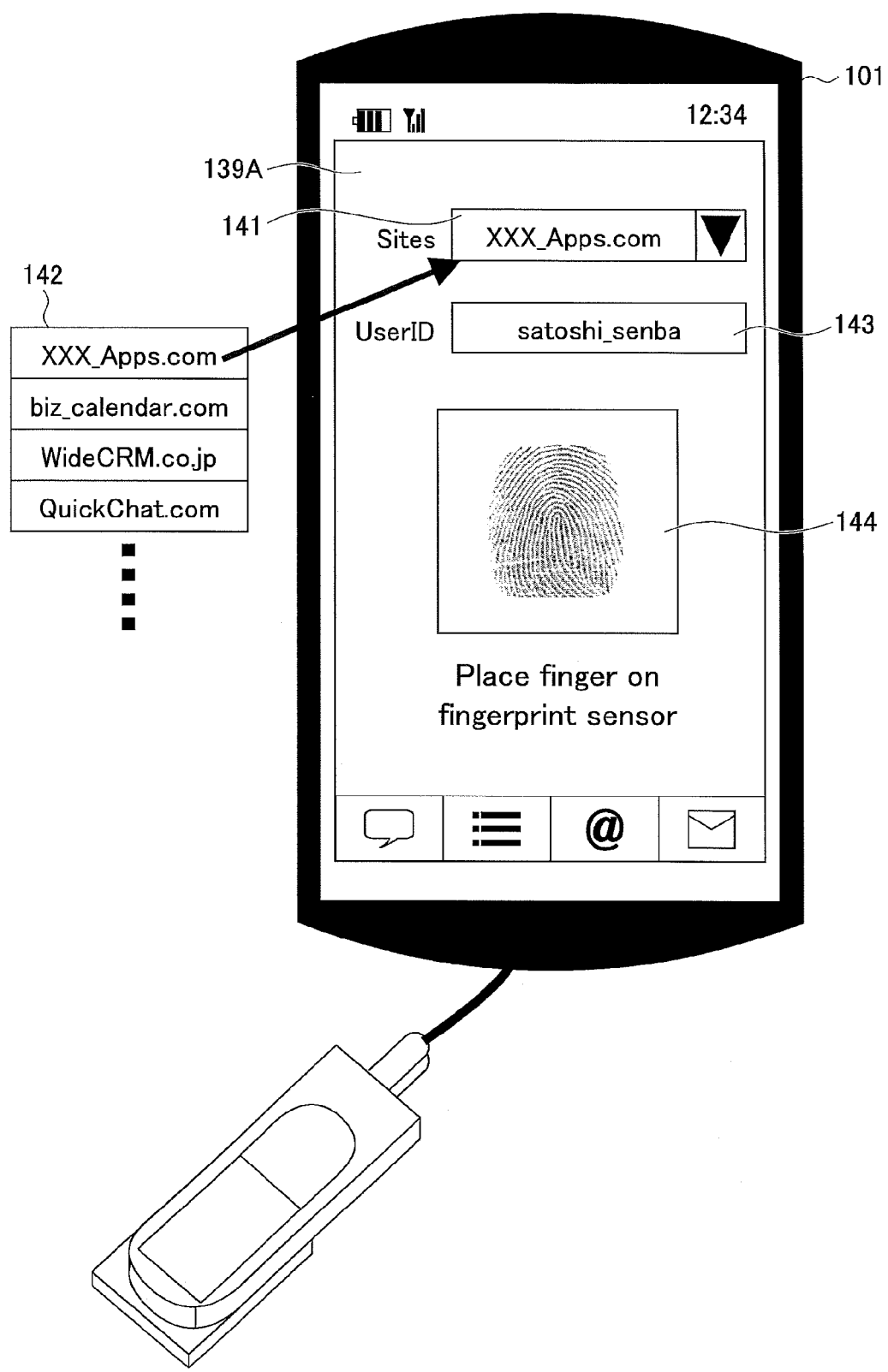
FIG. 11 is a diagram illustrating an example of a screen displayed on the mobile terminal.

FIG. 11 is a diagram illustrating an example of a screen displayed on the mobile terminal. FIG. 11 illustrates a state in which the authentication-management-application 139 displays a display screen 139A. For example, when the integrated authentication server 106, in step 701B illustrated in FIG. 10, displays a list of service server names (illustration of the service server URLs is omitted) on the mobile terminal 101 by a pull-down menu 142, the mobile terminal 101, in step 702, inputs the service server selected by the user from the pull-down menu 142 into a sites field 141, and receives the user ID input to a user ID field 143 by the user. In addition, the mobile terminal 101, in step 702, determines the user ID and the service server 105 at the connecting destination, from the information input in the sites field 141 and the user ID field 143. In this example, the mobile terminal 101, in step 703, causes the fingerprint sensor 102 to detect the fingerprint data of the user, and the detected fingerprint data is displayed in a field 144, however, the display of the fingerprint data on the mobile terminal 101 may be omitted.

Figure 12:
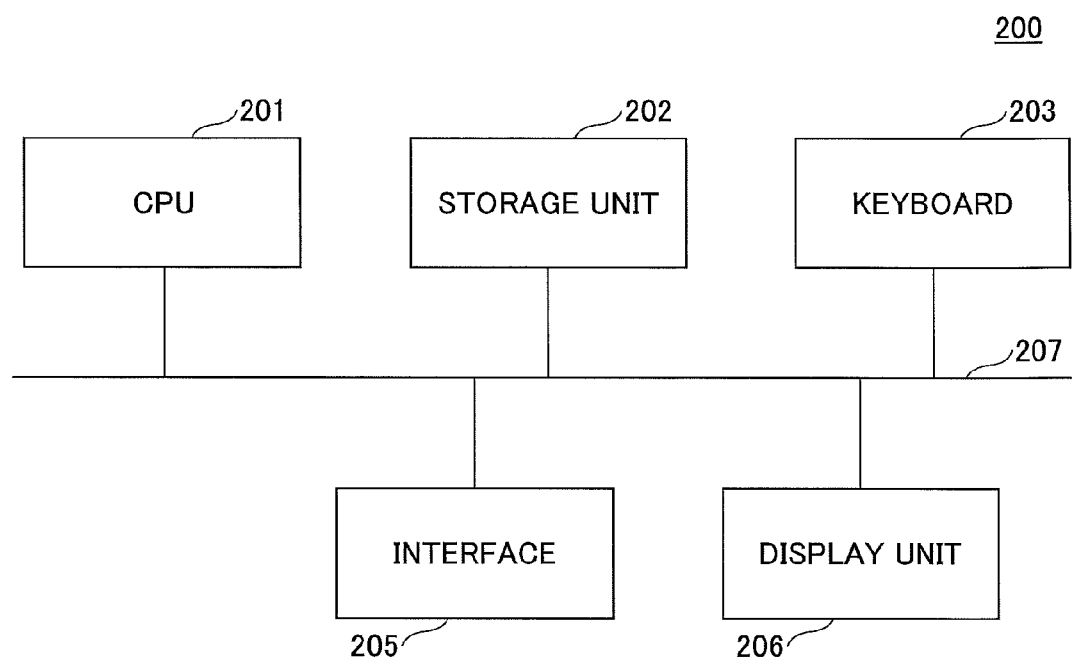
FIG. 12 is a block diagram illustrating an example of a configuration of a computer.

FIG. 12 is a block diagram illustrating an example of a configuration of a computer. A computer 200 illustrated in FIG. 12 may include a CPU (Central Processing Unit) 201, a storage unit 202, a keyboard 203, an interface 205, and a display unit 206. The CPU 201 is an example of a processor, and the storage unit 202 is an example of a storage part or a storage means. The keyboard 203 is an example of an input device. The display unit 206 is an example of an output device. In this example, the CPU 201, the storage unit 202, the keyboard 203, the interface 205, and the display unit 206 are connected via a bus 207. However, the computer 200 is not limited to the configuration in which the constituent elements of the computer 200 are connected by the bus 207.

In a case in which the computer 200 forms the mobile terminal 101, the interface 205 includes a known communication unit having a wireless communicating function, and this communication unit can make a wireless connection to the Internet 103 through an antenna or the like. In addition, the interface 205 includes a known USB connection unit capable of making a USB connection, and this USB connection unit enables the fingerprint sensor 102 or the like to be connected to the mobile terminal 101. The communication unit may be connected to the bus 207, as a separate unit from the interface 205 that includes the USB connection unit. Further, in a case in which the mobile terminal 101 includes the fingerprint sensor 102, the fingerprint sensor 102 may be directly connected to the bus 207.

On the other hand, in a case in which the computer 200 forms the service server 105 or the integrated authentication server 106, the interface 205 includes a known communication unit having a communicating function, and this communication unit is communicably connected to the router 107 or the router 108.

The storage unit 202 may store one or more programs to be executed by the CPU 201, various data, or the like. The storage unit 202, which stores one or more programs, may form an example of a non-transitory computer-readable storage medium. The storage unit 202 may be formed by a memory, a storage such as an HDD (Hard Disk Drive), or the like. The CPU 201 controls the entire computer 200 by executing one or more programs stored in the storage unit 202. The CPU 201 may execute the one or more programs to perform the operation of the mobile terminal 101 illustrated in FIG. 10, or the operation of the service server 105 illustrated in FIG. 10, or the operation of the integrated authentication server 106 illustrated in FIG. 10. In a case in which the one or more programs, when executed by the CPU 201, performs the operation of the mobile terminal 101, the one or more programs may include the host controller 132, the mobile terminal OS 134, the browser 137, the browser's child process 138, and the authentication-management-application 139 illustrated in FIG. 8.

The keyboard 203 is operated by the user and may be used to input commands and data to the CPU 201. The interface 205 may be used to connect the computer 200 to an external apparatus. The display unit 206 may be used to display various messages, data, or the like to the user of the computer 200, under the control of the CPU 201. In the case in which the computer 200 forms the mobile terminal 101, the display unit 206 may display the screen illustrated in FIG. 11, for example. The keyboard 203 and the display unit 206 may be provided integrally as illustrated in FIG. 11 in the form of a touchscreen panel, for example.

In the embodiments described above, the following measures are taken in order to perform the substitute authentication and the log-in by the biometric data, in the mobile terminal OS that cannot implement the plug-in in the browser, cannot perform the inter-process communication, and cannot add the device driver.

First, the integrated authentication server having the biometric authentication part and the SAML2 server IdP part is prepared. Next, the service server, having the SAML2 server SP part, and for providing the cloud services, is prepared, and the integrated authentication server is caused to perform the substitute authentication with respect to the service server. The cloud service in many cases corresponds to the SAML2 authentication, and the administrator may simply set the SAML2 authentication. The biometric authentication such as the fingerprint authentication, and the SAML2 authentication, are provided by open sources, products, or the like, and may be prepared according to existing facilities owned by the company or organization, for example. Hence, the user may connect the fingerprint sensor to the mobile terminal using the USB, and the authentication-management-application, which drives the fingerprint sensor to perform the authentication and performs the substitute log-in to the service server based on the authentication result, may be installed in the mobile terminal.

The authentication-management-application may call the device driver of the USB host controller through the API of the mobile terminal OS. The mobile terminal may transmit data directly to and receive data directly from the fingerprint sensor that is connected to the USB host controller, through the device driver. For this reason, the fingerprint sensor may be controlled by transmitting command data directly to the fingerprint sensor. Accordingly, the matching biometric data of the user may be acquired from the fingerprint sensor, without implementing a device driver of the fingerprint sensor. In addition, by transmitting the matching biometric data together with the user ID to the integrated authentication server to request user authentication, and when the user authentication is successful, it is possible to acquire the OTP that is to be transferred when the authentication is requested from the SAML2 server IdP part.

The authentication-management-application may request the service to be provided, with respect to the SAML2 server SP part of the service server, and redirect the returned SAML2 data to the SAML2 server IdP part. In addition, the authentication-management-application may redirect the SAML2 data transmitted from the SAML2 server IdP part to the SAML2 server SP part. The SAML2 protocol is an extremely complex protocol in that the SOAP protocol is implemented on the HTTPS protocol, and the SAML2 protocol is further implemented on the SOAP protocol. However, virtually all of the processes may be performed in the SAML2 server IdP part and the SAML2 server SP part. The mobile terminal may specify the server to which a transfer is to be made, according to the "Location:" description within the HTTP response header, or the "Refresh" description, "meta data <meta http-equiv="Refresh"", existing within an html body surrounded by header parts <head> and </head>, and the remaining parts may be transmitted as the data. Hence, the authentication-management-application can be implemented in a relatively small number of steps.

The authentication-management-application can be implemented in a relatively small number of steps. However, the browser, which performs and displays the services provided by the service server by linking with the service sever, requires a relatively large number of steps to be implemented. In addition, even if the authentication-management-application were implemented as an application for the mobile terminal OS, the application that is subsequently added would not be able to directly operate native functions of the hardware, when compared to the default application that is initially prepared together with the mobile terminal OS, and the execution speed of the subsequently added application may generate a problem.

For this reason, the authentication-management-application first transfers the user ID and the matching biometric data to the integrated authentication server, in order to acquire the OTP. Next, the authentication-management-application outputs the service providing request to the SAML2 server SP part of the service server, in order to start the authentication using the SAML2 protocol. The authentication-management-application relays the SAML2 data communication between the SAML2 server SP part and the SAML2 server IdP part. When the html page requesting the user ID and the password is transmitted from the integrated authentication server, the authentication-management-application discards the html page and does not display the screen thereof, but instead transmits the user ID and the OTP that are prepared in advance. Hence, a successful SAML2 authentication can be performed, and the URL-added SAML authentication response message permitting the use of the service is transmitted from the SAML2 server IdP part to the SAML2 server SP part.

Therefore, the authentication-management-application does not redirect, but instead generates the browser's child process of the default application using the URL-added SAML authentication response message as the argument. The SAML2 authentication thereafter may be performed by the browser's child process of the default application. Because the authentication of the user ID and the password is already completed, the SAML authentication by the browser's child process is performed to the end, so that the use of the service is permitted and the service becomes usable. In addition, since the service is performed by the browser's child process of the default application, a smooth process can be performed with a sufficiently high execution speed.

Accordingly, the use of the services from the cloud service provider can be authenticated, not by the password input by the user, but by the substitute authentication using the biometric data matching. In addition, the implementation of the SAML2 function may be minimized by simply employing the redirect process. By submitting the SAML2 authentication process to the browser's child process of the default application at the end of the process, the service may be performed at a high execution speed with efficient hardware acceleration.

Although the embodiments described above employ the fingerprint sensor for the biometric sensor, a vein sensor or an iris sensor may be used for the biometric sensor, in order to similarly obtain vein data or iris data, which are examples of the biometric data.

In another embodiment, an IC (Integrated Circuit) card or a USB storage, such as a USB token, may be connected to the mobile terminal, in place of the biometric sensor. In this case, an encryption key (or signature data) issued for each user in advance by the integrated authentication server, using a random number, may be stored in the USB storage. The encryption key that is read from the USB storage may be transmitted to the integrated authentication server, in place of the matching biometric data, and the user authentication may be performed by confirming the correctness of the encryption key at the integrated authentication server. By judging whether the encryption key read from the USB storage and transmitted from the mobile terminal to the integrated authentication server is the encryption key issued for each user, the integrated authentication server may perform the authentication using the user's belonging such as the IC card and the USB token, that is, the substitute authentication in place of the password.

According to each of the embodiments described above, an authenticating function can be added in a relatively easy manner, by externally connecting a device that is used for the user authentication, to a communication terminal such as a mobile terminal.

As described above, the mobile terminal is restricted from additionally implementing a device driver, making a substitute input of a password by an inter-process communication, and making a substitute reply by a browser plug-in, due to security restrictions, business model restrictions, or the like. Hence, in each of the embodiments described above, the mobile terminal is provided with a function to redirect the SAML2 data, a function to make the substitute reply of the password to the biometric authentication part, and a function to transfer the SAML2 data transmitted after the password to the browser's child process, in order to perform the substitute authentication using the biometric authentication or token, without requiring the user to input the password.

The description above use terms such as "determine", "identify", or the like to describe the embodiments, however, such terms are abstractions of the actual operations that are performed. Hence, the actual operations that correspond to such terms may vary depending on the implementation, as is obvious to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication terminal communicable with first and second servers through a network, comprising:
    a processor including a browser, a host controller, an operating system, and an authentication-management-application,
    wherein the browser is configured to reject an inter-process communication that is being executed, and start a child process by accepting, as an argument, an inter-process communication received from another application and permitted by exception, under conditions in which the operating system is restricted from adding a device driver, making an inter-process communication amongst applications of the communication terminal, and expanding the browser by a plug-in,
    wherein the operating system controls the host controller by calling one of a plurality of interfaces, including a certain interface that controls a sensor, and
    wherein the authentication-management-application exchanges data with the sensor that is coupled to the host controller through the certain interface of the operating system, and performs a process including
        requesting a user authentication by transmitting to the second server a user ID and matching data detected by the sensor, and acquiring a password transmitted from the second server in a case in which the user authentication is successful;
        relaying, between the first server and the second server, authentication data transmitted from the first server in response to requesting the first server to provide a service;
        first transmitting a user ID that is prepared in advance and the acquired password to the second server, in a case in which a screen that urges the user ID and the password to be input is received from the second server; and
        disconnecting a communication with the second server without redirecting an authentication response that includes information specifying the first server and is transmitted from the second server in a case in which a pair of the user ID and the password transmitted to the second server is stored in the second server and the user authentication is successful, and starting the child process of the browser by the argument based on the authentication response and transmitting the authentication response to the first server, to make a log-in to and receive the service from the first server.

2. The communication terminal as claimed in claim 1, wherein
    the authentication-management-application redirects the authentication data transmitted from the first server to the second server, and redirects authentication data transmitted from the second server to the first server.

3. The communication terminal as claimed in claim 1, wherein the authentication-management-application performs the process including
    acquiring a list of a plurality of first servers providing services;

acquiring data detected by the sensor by controlling the sensor;

urging a user to input a service name and the user ID;

receiving the password by transmitting the user ID and the data detected by the sensor to the second server;

making a service providing request with respect to a selected one of the plurality of first servers, according to information specifying the one of the plurality of first servers that is selected and forms a pair with the service name;

redirecting the authentication data transmitted from the selected one of the plurality of first servers to the second server according to a redirect setting, and in a case in which the screen that urges the user ID and the password to be input is received from the second server, transmitting the user ID that is prepared in advance and the acquired password to the second server by the authentication-management-application without making a screen display according to the screen;

second transmitting the user ID input in response to the urging and the password received by the receiving to the second server, with respect to a request for the user ID and the password transmitted from the second server; and connecting to the selected one of the plurality of first servers according to a server domain part within the authentication data, when the authentication data is first received after transmitting the user ID and the password by the second transmitting, and generating the child process of the browser to which an added authentication data part within the authentication data is transferred.

4. The communication terminal as claimed in claim 1, wherein the data detected by the sensor includes biometric data selected from a group consisting of fingerprint data, vein data, and iris data.

5. The communication terminal as claimed in claim 1, wherein the network includes the Internet, and the information specifying the first server includes a Uniform Resource Locator (URL).

6. The communication terminal as claimed in claim 1, wherein the authentication data includes authentication data in conformance with Security Assertion Markup Language 2.0 (SAML2).

7. The communication terminal as claimed in claim 1, wherein the data detected by the sensor includes data for authenticating an IC (Integrated Circuit) card or a USB (Universal Serial Bus) token belonging to the user.

8. A secure log-in method for a communication terminal communicable with first and second servers through a network, comprising:

starting, by a browser of the communication terminal, configured to reject an inter-process communication that is being executed, a child process of the browser by accepting, as an argument, an inter-process communication received from another application and permitted by exception, under conditions in which an operating system of the communication terminal is restricted from adding a device driver, making an inter-process communication amongst applications of the communication terminal, and expanding the browser by a plug-in;

calling one of a plurality of interfaces of an operating system that controls a host controller of the communication terminal, including a certain interface that controls a sensor, and exchanging data with the sensor that is coupled to the host controller through the certain interface of the operating system, by an authentication-management-application of the communication terminal;

requesting a user authentication by transmitting to the second server a user ID and matching data detected by the sensor, by the authentication-management-application;

transmitting a password from the second server to the communication terminal in a case in which the user authentication is successful;

relaying, between the first server and the second server, authentication data transmitted from the first server in response to requesting the first server to provide a service, by the authentication-management-application;

transmitting a user ID that is prepared in advance and the acquired password from the authentication-management-application to the second server, in a case in which a screen that urges the user ID and the password to be input is received from the second server;

transmitting an authentication response that includes information specifying the first server, from the second server in a case in which a pair of the user ID and the password transmitted from the communication terminal is stored in the second server and the user authentication is successful; and disconnecting a communication with the second server without redirecting the authentication response, and starting the child process of the browser by the argument based on the authentication response and transmitting the authentication response to the first server, by the authentication-management-application, to make a log-in to and receive the service from the first server.

9. The secure log-in method as claimed in claim 8, wherein the authentication-management-application redirects the authentication data transmitted from the first server to the second server, and redirects authentication data transmitted from the second server to the first server.

10. The secure log-in method as claimed in claim 8, wherein the authentication-management-application performs a process including acquiring a list of a plurality of first servers providing services;

acquiring data detected by the sensor by controlling the sensor;

urging a user to input a service name and the user ID;

receiving the password by transmitting the user ID and the data detected by the sensor to the second server;

making a service providing request with respect to a selected one of the plurality of first servers, according to information specifying the one of the plurality of first servers that is selected and forms a pair with the service name;

redirecting the authentication data transmitted from the selected one of the plurality of first servers to the second server according to a redirect setting, and in a case in which the screen that urges the user ID and the password to be input is received from the second server, transmitting the user ID that is prepared in advance and the acquired password to the second server by the authentication-management-application without making a screen display according to the screen;

transmitting the user ID input in response to the urging and the password received by the receiving to the second server, with respect to a request for the user ID and the password transmitted from the second server; and connecting to the selected one of the plurality of first servers according to a server domain part within the authentication data, when the authentication data is first received after transmitting the user ID and the password by the transmitting the user ID input in response to the urging, and generating the child process of the browser to which an added authentication data part within the authentication data is transferred.

11. The secure log-in method as claimed in claim 8, wherein the data detected by the sensor includes biometric data selected from a group consisting of fingerprint data, vein data, and iris data.

12. The secure log-in method as claimed in claim 8, wherein the network includes the Internet, and the information specifying the first server includes a Uniform Resource Locator (URL).

13. The secure log-in method as claimed in claim 8, wherein the authentication data includes authentication data in conformance with Security Assertion Markup Language 2.0 (SAML2).

14. The secure log-in method as claimed in claim 8, wherein the data detected by the sensor includes data for authenticating an IC (Integrated Circuit) card or a USB (Universal Serial Bus) token belonging to the user.

15. A non-transitory computer-readable storage medium having stored therein a program for causing a processor of a communication terminal that is communicable with first and second servers through a network to execute a process comprising:

starting, by a browser of the processor, configured to reject an inter-process communication that is being executed, a child process of the browser by accepting, as an argument, an inter-process communication received from another application and permitted by exception, under conditions in which an operating system of the processor is restricted from adding a device driver, making an inter-process communication amongst applications of the processor, and expanding the browser by a plug-in; and calling one of a plurality of interfaces of the operating system that controls a host controller of the processor, including a certain interface that controls a sensor, and exchanging data with the sensor that is coupled to the host controller through the certain interface of the operating system, by an authentication-management-application of the processor, wherein the authentication-management-application includes requesting a user authentication by transmitting to the second server a user ID and matching data detected by the sensor, and acquiring a password from the second server transmitted from the second server in a case in which the user authentication is successful;

relaying, between the first server and the second server, authentication data transmitted from the first server in response to requesting the first server to provide a service;

transmitting a user ID that is prepared in advance and the acquired password to the second server, in a case in which a screen that urges the user ID and the password to be input is received from the second server; and disconnecting a communication with the second server without redirecting an authentication response that includes information specifying the first server and is transmitted from the second server in a case in which a pair of the user ID and the password transmitted to the second server is stored in the second server and the user authentication is successful, and starting the child process of the browser by the argument based on the authentication response and transmitting the authentication response to the first server, to make a log-in to and receive the service from the first server.

16. The non-transitory computer-readable storage medium as claimed in claim 15, wherein the authentication-management-application redirects the authentication data transmitted from the first server to the second server, and redirects authentication data transmitted from the second server to the first server.

17. The non-transitory computer-readable storage medium as claimed in claim 15, wherein the authentication-management-application performs a process including acquiring a list of a plurality of first servers providing services;

acquiring data detected by the sensor by controlling the sensor;

urging a user to input a service name and the user ID;

receiving the password by transmitting the user ID and the data detected by the sensor to the second server;

making a service providing request with respect to a selected one of the plurality of first servers, according to information specifying the one of the plurality of first servers that is selected and forms a pair with the service name;

redirecting the authentication data transmitted from the selected one of the plurality of first servers to the second server according to a redirect setting, and in a case in which the screen that urges the user ID and the password to be input is received from the second server, transmitting the user ID that is prepared in advance and the acquired password to the second server by the authentication-management-application without making a screen display according to the screen;

transmitting the user ID input in response to the urging and the password received by the receiving to the second server, with respect to a request for the user ID and the password transmitted from the second server; and connecting to the selected one of the plurality of first servers according to a server domain part within the authentication data, when the authentication data is first received after transmitting the user ID and the password by the transmitting the user ID input in response to the urging, and generating the child process of the browser to which an added authentication data part within the authentication data is transferred.

18. The non-transitory computer-readable storage medium as claimed in claim 15, wherein the data detected by the sensor includes biometric data selected from a group consisting of fingerprint data, vein data, and iris data.

19. The non-transitory computer-readable storage medium as claimed in claim 15, wherein the network includes the Internet, and the information specifying the first server includes a Uniform Resource Locator (URL).

20. The non-transitory computer-readable storage medium as claimed in claim 15, wherein the authentication data includes authentication data in conformance with Security Assertion Markup Language 2.0 (SAML2).

* * * * *